US012750581B2

(12) United States Patent
Du et al.

(10) Patent No.: US 12,750,581 B2
(45) Date of Patent: Sep. 29, 2026

(54) SHOOTING MODE RECOMMENDATION METHOD

(71) Applicant: HONOR DEVICE CO., LTD., Shenzhen (CN)

(72) Inventors: Yuanchao Du, Shenzhen (CN); Bo Zhang, Shenzhen (CN); Chunlin Tian, Shenzhen (CN); Shiyu Zhu, Shenzhen (CN); Zuochao Zhang, Shenzhen (CN); Lingli Chang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 31 days.

(21) Appl. No.: 18/867,769

(22) PCT Filed: Aug. 26, 2023

(86) PCT No.: PCT/CN2023/115110
§ 371 (c)(1),
(2) Date: Nov. 20, 2024

(87) PCT Pub. No.: WO2024/109224
PCT Pub. Date: May 30, 2024

(65) Prior Publication Data

US 2026/0205683 A1 Jul. 16, 2026

(30) Foreign Application Priority Data

Nov. 22, 2022 (CN) ........................ 202211467907.X

(51) Int. Cl.
*H04N 23/60* (2023.01)
*H04N 23/63* (2023.01)
*H04N 23/667* (2023.01)

(52) U.S. Cl.
CPC ........... *H04N 23/64* (2023.01); *H04N 23/632* (2023.01); *H04N 23/667* (2023.01)

(58) Field of Classification Search
CPC ..... H04N 23/64; H04N 23/667; H04N 23/632
(Continued)

(56) References Cited

U.S. PATENT DOCUMENTS 8,520,116 B2 * 8/2013 Kang .................... H04N 23/62 348/222.1
9,584,735 B2 * 2/2017 Diaz ..................... H04N 23/80
(Continued)

FOREIGN PATENT DOCUMENTS

CN 104243822 A 12/2014
CN 104660908 A 5/2015
(Continued)

*Primary Examiner* — Pritham D Prabhakher
(74) *Attorney, Agent, or Firm* — WOMBLE BOND DICKINSON (US) LLP

(57) ABSTRACT

This application provides a shooting mode recommendation method. The method may be applied to an electronic device, such as a digital camera or a mobile phone, that can provide a shooting service by using a camera. Through the method, the electronic device may obtain each frame of image generated by the camera in real time, and determine feature information of each frame of image. The electronic device may determine, based on the feature information of the image, a shooting scene in which a user is currently located, and then determine a shooting mode that is most adapted to a current shooting scene. Then the electronic device may display a recommendation tag corresponding to a currently recommended shooting mode in a shooting interface.

19 Claims, 18 Drawing Sheets

(58) Field of Classification Search
USPC ........................................................ 348/220.1
See application file for complete search history.

(56) References Cited

U.S. PATENT DOCUMENTS

| | | | | |
|---|---|---|---|---|
| 9,928,028 | B2 * | 3/2018 | Jung | G06F 3/04845 |
| 10,200,597 | B2 | 2/2019 | Choi et al. | |
| 10,341,529 | B2 * | 7/2019 | Cho | H04N 23/62 |
| 10,924,677 | B2 * | 2/2021 | Kim | G06V 20/35 |
| 11,503,208 | B2 | 11/2022 | Song et al. | |
| 11,698,706 | B2 * | 7/2023 | Kim | G06F 3/0481 715/768 |
| 11,765,463 | B2 * | 9/2023 | Li | H04N 5/772 348/207.99 |
| 11,895,399 | B2 | 2/2024 | Fan | |
| 12,135,976 | B2 * | 11/2024 | Zhang | G06F 9/451 |
| 12,604,083 | B2 * | 4/2026 | Huang | H04N 23/632 |
| 2007/0153111 | A1 | 7/2007 | Kato | |
| 2011/0007177 | A1 | 1/2011 | Kang | |
| 2014/0204244 | A1 * | 7/2014 | Choi | H04N 23/64 348/333.05 |
| 2015/0235366 | A1 | 8/2015 | Lee et al. | |
| 2015/0350533 | A1 * | 12/2015 | Harris | H04N 23/73 348/362 |
| 2018/0069983 | A1 * | 3/2018 | Cho | H04N 23/632 |
| 2018/0335939 | A1 * | 11/2018 | Karunamuni | G06F 9/445 |
| 2020/0053288 | A1 | 2/2020 | Kim et al. | |
| 2020/0257436 | A1 * | 8/2020 | Yun | H04M 1/725 |
| 2021/0014420 | A1 | 1/2021 | Song et al. | |
| 2022/0159183 | A1 * | 5/2022 | Li | H04N 5/772 |
| 2022/0217275 | A1 * | 7/2022 | Fan | H04N 23/80 |
| 2022/0318036 | A1 * | 10/2022 | Zhang | G06F 3/04812 |
| 2025/0097567 | A1 | 3/2025 | Huang et al. | |

FOREIGN PATENT DOCUMENTS

| | | | |
|---|---|---|---|
| CN | 104679876 | A | 6/2015 |
| CN | 107295255 | A | 10/2017 |
| CN | 111630836 | A | 9/2020 |
| CN | 113645408 | A | 11/2021 |
| CN | 113727025 | A | 11/2021 |
| CN | 115883957 | A | 3/2023 |
| EP | 2757773 | A2 | 7/2014 |
| EP | 4027634 | A1 | 7/2022 |
| EP | 4440133 | A1 | 10/2024 |
| JP | 2012109921 | A | 6/2012 |
| WO | 2021175247 | A1 | 9/2021 |

* cited by examiner

SHOOTING MODE RECOMMENDATION METHOD

CROSS-REFERENCE TO RELATED APPLICATIONS

This application is a national stage of International Application No. PCT/CN2023/115110, filed on Aug. 26, 2023, which claims priority to Chinese Patent Application No. 202211467907.X, filed on Nov. 22, 2022. The disclosures of both of the aforementioned applications are hereby incorporated by reference in their entireties.

TECHNICAL FIELD

This application relates to the field of terminals, and in particular, to a shooting mode recommendation method.

BACKGROUND

In electronic devices such as digital cameras and mobile phones, to provide users with a better shooting function and shooting experience, various shooting modes adapted to specific shooting scenes have been successively introduced, for example, a portrait mode, a night scene mode, and a high dynamic range (High Dynamic Range, HDR) video recording mode. When a user selects a shooting mode adapted to a current shooting scene, for example, selects a portrait mode for shooting a person, the user can obtain a photo or a video with better picture quality, thereby obtaining better shooting experience.

However, as shooting modes increase, user selection costs increase. The user needs more prior experience for determining a shooting mode that best matches a current shooting scene. In addition, as the shooting modes increases, a depth of an entrance corresponding to the shooting mode increases, and the user needs to determine an entrance to a specific shooting mode through more operations, to enter the shooting mode. In view of the foregoing problems, various shooting modes provided by an electronic device often cannot be fully used, and it is also difficult for the user to obtain better shooting experience.

SUMMARY

According to a first aspect, this application provides a shooting mode recommendation method. The method is applied to an electronic device including a camera. The method includes: displaying a first preview interface, where the first preview interface includes a first preview window, and the first preview window is configured to display an image captured by the camera in real time; capturing one or more images through the camera in a first time period; determining a first shooting mode based on the one or more images captured in the first time period; displaying a first control in the first preview interface, where the first control is configured to trigger the electronic device to perform video recording in the first shooting mode; and if a first operation for the first control is not detected within first preset time, displaying the first preview window, and skipping displaying the first control; or if the first operation for the first control is detected within first preset time, displaying a second preview interface in response to the first operation, where the second preview interface includes a second preview window, the second preview window is configured to display a first image, and the first image is an image obtained by processing an image captured by the camera in real time in the first shooting mode.

Through the method provided in the first aspect, the electronic device may capture images in real time, and determine, based on the captured one or more images, a shooting mode matching a current shooting scene. The electronic device may display, on the screen, a mode recommendation control corresponding to the matched shooting mode. In this way, the user can quickly enter a proper shooting mode through the mode recommendation control displayed in the electronic device, thereby obtaining better shooting experience. If a user operation for the mode recommendation control is not detected within preset time, the electronic device may determine that the user does not need the shooting mode recommended by the electronic device. In this case, the electronic device may cancel display of the control, to eliminate blocking of a preview interface by the mode recommendation control.

With reference to the method provided in the first aspect, in some embodiments, after the displaying the first preview window, and skipping displaying the first control, the method further includes: capturing one or more images through the camera in a second time period, where the second time period is different from the first time period; determining a second shooting mode based on the one or more images captured in the second time period; displaying a second control in the first preview interface, where the second control is configured to trigger the electronic device to perform video recording in the second shooting mode, and the second shooting mode is different from the first shooting mode; and if a second operation for the second control is not detected within second preset time, displaying the first preview window, and skipping displaying the second control; or if a second operation for the second control is detected within second preset time, displaying a third preview interface in response to the second operation, where the third preview interface includes a third preview window, the third preview window is configured to display a second image, and the second image is an image obtained by processing an image captured by the camera in real time in the second shooting mode.

Through the method provided in the foregoing embodiment, after a shooting scene change is detected, the electronic device may update the shooting mode matching the current scene in real time, and correspondingly update the mode recommendation control displayed on the screen. In this way, in any scene, the user can quickly and conveniently obtain a shooting mode matching a current shooting scene, thereby obtaining better shooting experience.

With reference to the method provided in the first aspect, in some embodiments, after the displaying a first control in the first preview interface, the method further includes: determining, based on one or more images captured in a third time period, that a matching condition of the first shooting mode is not satisfied; and no longer displaying the first control, where the third time period is after the first time period, and the third time period is within the first preset time.

Through the method provided in the foregoing embodiment, before the preset time ends, if it is detected that the current shooting scene changes and no longer matches a previously recommended shooting mode, the electronic device may cancel display of a corresponding mode recommendation control before the preset time ends, so that the user avoids selecting a shooting mode that does not match the current shooting scene and affecting shooting experience of an application.

With reference to the method provided in the first aspect, in some embodiments, before the no longer displaying the first control, the method further includes: determining that the one or more images captured in the third time period satisfy an exit condition of the first shooting mode, where the exit condition is mutually exclusive but not opposite to the matching condition.

Through the method provided in the foregoing embodiment, an exit condition of a shooting mode may be included in an opposing set of a matching condition. In this way, in a shooting process, only when a detected shooting scene satisfies the exit condition, the electronic device stops displaying the corresponding mode recommendation control. For example, after the macro mode is recommended, a stability detection module determines that the macro mode is not matched only when an object distance exceeds 17 cm, rather than 12 cm before the recommendation. In this way, complex situations in the shooting process of the user are taken into consideration, thereby reducing restrictions on the user, and further improving user experience.

With reference to the method provided in the first aspect, in some embodiments, the second time period is before the third time period, and the displaying a second control in the first preview interface specifically includes: displaying the second control and the first control in the first preview interface.

Through the method provided in the foregoing embodiment, the electronic device may match a plurality of shooting modes at the same time, and recommend the plurality of shooting modes to the user. The user may select any shooting mode recommended by the electronic device for shooting according to needs of the user. In this way, while convenient operations are provided for the user, personalization needs of the user are further satisfied.

With reference to the method provided in the first aspect, in some embodiments, the determining a first shooting mode based on the one or more images captured in the first time period specifically includes: determining the first shooting mode when the one or more images captured in the first time period satisfy both the matching condition of the first shooting mode and a matching condition of a third shooting mode, and a priority of the first shooting mode is higher than a priority of the third shooting mode.

Through the method provided in the foregoing embodiment, the electronic device may match a plurality of shooting modes at the same time. Then, the electronic device may recommend, based on priorities of the plurality of matched shooting modes, a shooting mode with a higher priority to the user. In this way, in a complex shooting scene, the user can also quickly obtain a shooting mode most adapted to the current shooting scene, and quickly enter the mode for shooting. This both reduces selection costs of the user and reduces user operations, so that the shooting experience of the user is improved.

With reference to the method provided in the first aspect, in some embodiments, the first preview interface is a photograph preview interface or a recorded video preview interface.

Through the method provided in the foregoing embodiment, the electronic device may recommend a shooting mode suitable for a current shooting scene to the user during photographing, or may recommend a shooting mode suitable for a current shooting scene to the user during video recording.

With reference to the method provided in the first aspect, in some embodiments, the method further includes: detecting a third operation for the first control and the second control; and displaying a fourth preview interface in response to the third operation, where the fourth preview interface includes a fourth preview window and a fifth preview window, the fourth preview window is configured to display the first image, and the fifth preview window is configured to display the second image.

Through the method provided in the foregoing embodiment, when the electronic device recommends a plurality of shooting modes at the same time, the electronic device may display preview images corresponding to the plurality of shooting modes at the same time. In this way, the user can preview specific effects of the shooting modes, which facilitates the user determining a shooting effect corresponding to a mode that is more suitable for needs of the user, and then select the shooting mode for shooting.

With reference to the method provided in the first aspect, in some embodiments, the first shooting mode is any one of the following plurality of shooting modes: a macro mode, a night scene mode, a portrait mode, a high dynamic range mode, a protagonist mode, or a multi-lens mode; and the second shooting mode is any one of the following plurality of shooting modes: the macro mode, the night scene mode, the portrait mode, the high dynamic range mode, the protagonist mode, or the multi-lens mode.

Through the method provided in the foregoing embodiment, when the current shooting scene is suitable for the macro mode, the electronic device may recommend the macro mode to the user (that is, display a mode recommendation control corresponding to the macro mode). In this way, the user can quickly and conveniently select the macro mode for shooting. When the current shooting scene is suitable for the night scene mode, the electronic device may recommend the night scene mode to the user. In this way, the user can quickly and conveniently select the night scene mode for shooting, and the like.

With reference to the method provided in the first aspect, in some embodiments, when the first shooting mode is the macro mode, the determining a first shooting mode based on the one or more images captured in the first time period is specifically: determining object distances of the one or more images captured in the first time period, and determining that the first shooting mode is the macro mode based on that each of the object distances is less than a preset value.

Through the method provided in the foregoing embodiment, the electronic device may determine, based on a distance between a shooting object in the image and the camera (namely, the object distance), whether the user shoots a close object, and then determine whether to recommend the macro mode.

With reference to the method provided in the first aspect, in some embodiments, when the first shooting mode is the night scene mode, the determining a first shooting mode based on the one or more images captured in the first time period is specifically: determining illuminance of the one or more images captured in the first time period; and determining, based on that the illuminance is less than a preset value, that the first shooting mode is the night scene mode.

Through the method provided in the foregoing embodiment, the electronic device may determine, through illuminance of an image, whether the user shoots in a dim environment, for example, shoots at night, and then determine whether to recommend the night scene mode.

With reference to the method provided in the first aspect, in some embodiments, when the first shooting mode is the portrait mode, the determining a first shooting mode based on the one or more images captured in the first time period is specifically: determining object information of each image of the one or more images captured in the first time period; and determining that the first shooting mode is the portrait mode when the object information of each image indicates that each image includes a portrait, and a portrait area is greater than a preset value.

Through the method provided in the foregoing embodiment, the electronic device may determine, through portrait recognition, whether the user shoots a person, and then determine whether to recommend the portrait mode.

With reference to the method provided in the first aspect, in some embodiments, when the first shooting mode is the high dynamic range mode, the determining a first shooting mode based on the one or more images captured in the first time period is specifically: determining exposure proportions of the one or more images captured in the first time period; and determining that the first shooting mode is the high dynamic range mode when each of the exposure proportions is greater than a preset value.

Through the method provided in the foregoing embodiment, the electronic device may determine, through an exposure of pixels in the image, whether overexposure occurs in the image, and then determine whether to recommend the high dynamic range mode.

According to a second aspect, this application provides an electronic device. The electronic device includes one or more processors and one or more memories. The one or more memories are coupled to the one or more processors, the one or more memories are configured to store computer program code, the computer program code includes computer instructions, and the one or more processors, when executing the computer instructions, enable the electronic device to perform the method according to the first aspect or any possible implementation of the first aspect.

According to a third aspect, this application provides a computer-readable storage medium, including instructions. The instructions, when executed in an electronic device, enable the electronic device to perform the method according to the first aspect or any possible implementation of the first aspect.

It may be understood that, the electronic device provided in the second aspect and the computer storage medium provided in the third aspect are both configured to perform the method provided in this application. Therefore, for beneficial effects that can be achieved, reference may be made to the beneficial effects in the corresponding method, and details are not described herein.

DESCRIPTION OF EMBODIMENTS

Figure 1A:
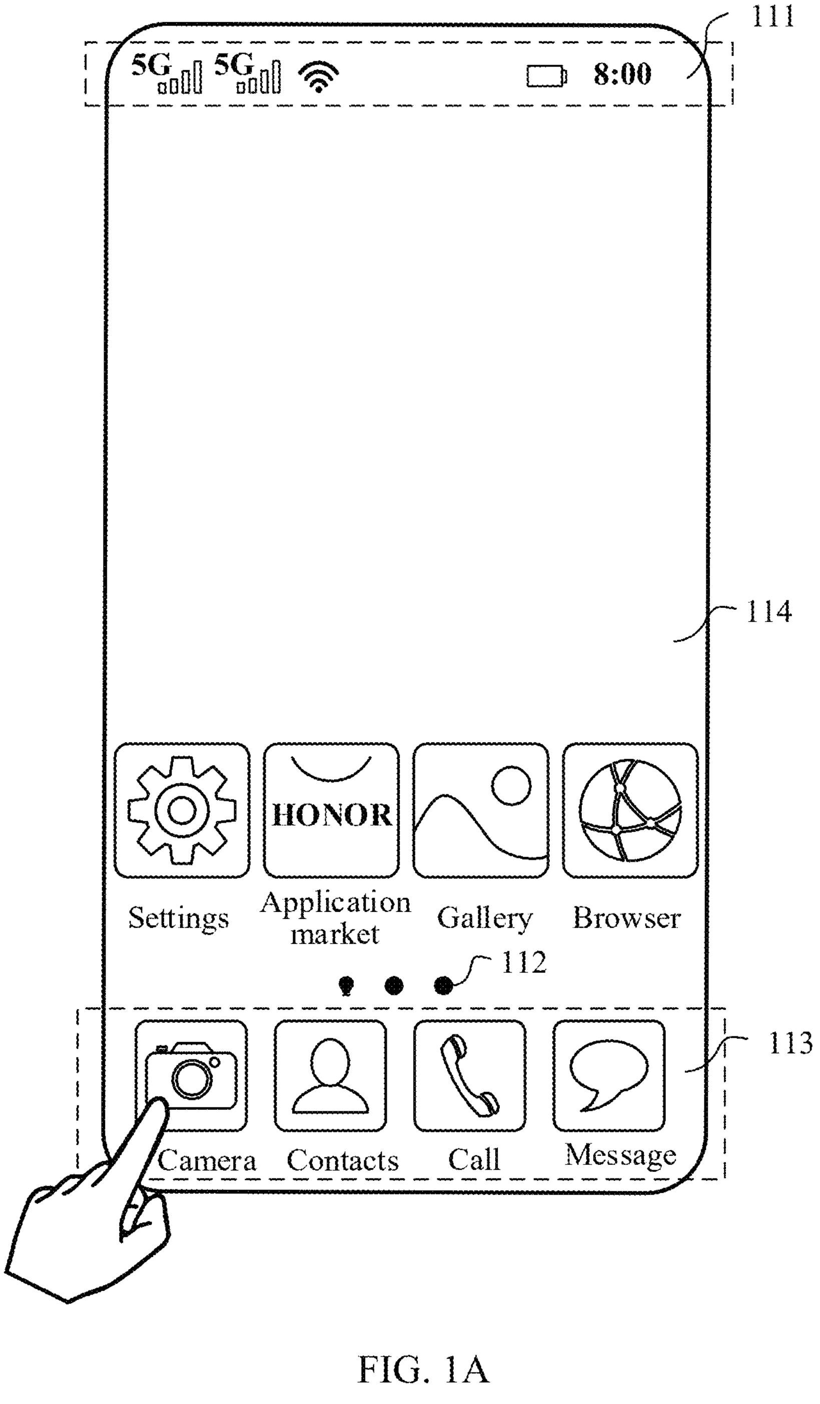
FIG. 1A to FIG. 1H show a group of user interfaces of an electronic device 100 in which a shooting mode recommendation method is performed according to an embodiment of this application.

Terms used in the following embodiments of this application are only intended to describe particular embodiments, and are not intended to limit this application.

Embodiments of this application provide a shooting mode recommendation method. The method may be applied to an electronic device, such as a digital camera or a mobile phone, that can provide a shooting service by using a camera. The electronic device is denoted as an electronic device 100.

Through the method, the electronic device 100 may obtain each frame of image generated by the camera in real time, and determine feature information of each frame of image. The feature information includes, but is not limited to, an object distance, illuminance (in lux Lux), a zoom ratio, an exposure proportion, an object, and the like. The object distance is a distance, in centimeter cm, between an object on which the camera focuses and a lens of the camera when a frame of image is shot. One frame of image corresponds to one focused object. Therefore, one frame of image corresponds to one object distance. The illuminance indicates intensity of light and an amount by which a surface area of an object is illuminated. A higher illuminance value indicates a darker brightness of an environment. The exposure proportion indicates a proportion of pixels in an overexposure state in an image. An excessively high exposure proportion of an image affects image quality. The object is an item appearing in an image, for example, a person, a cat, a dog, or a table and a chair. The electronic device 100 may determine a type of the object in the image according to a preset image recognition algorithm. Further, the image recognition algorithm may further output an area occupied by each object in the entire image, for the electronic device 100 to determine a shooting subject in one or more objects.

The electronic device 100 may determine, based on the feature information of the image, a shooting scene in which a user is currently located, and then determine a shooting mode that is most adapted to a current shooting scene. For example, the electronic device 100 may determine, based on the feature information of the image, that the user is shooting a person. In this case, the electronic device 100 may determine, based on the feature information, that the shooting mode that is most adapted to the current shooting scene is a portrait mode. Then, the electronic device 100 may display a recommendation tag in a shooting interface. The recommendation tag may indicate a shooting mode determined by the electronic device 100 and adapted to the current shooting scene. For example, the electronic device 100 may display a portrait recommendation tag, indicating to the user that the portrait mode is currently suitable for shooting. The user may quickly enter a shooting mode associated with the recommendation tag based on the recommendation tag displayed in the electronic device 100, and shoot in the shooting mode, to obtain a photo or a video with better picture quality, thereby obtaining better shooting experience.

Not limited to the digital camera or the mobile phone, the electronic device 100 may alternatively be a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, and/or a smart city device with an camera. A specific type of the electronic device is not specifically limited in embodiments of this application.

FIG. 1A to FIG. 1H show a group of user interfaces of an electronic device 100 in which a shooting mode recommendation method is performed according to an embodiment of this application.

FIG. 1A exemplarily shows a homepage (homepage, also referred to as a desktop) of the electronic device 100. As shown in FIG. 1A, the homepage may include a status bar 111, a page indicator 112, a common application program tray 113, and a general application program tray 114.

The status bar may include one or more signal strength indicators of a mobile communication signal (or a cellular signal), a signal strength indicator of a wireless fidelity (wireless fidelity, Wi-Fi) signal, a battery status indicator, a time indicator, and the like.

Both the common application program tray 113 and the general application program tray 114 are configured to bear application program icons. A user may tap on an application program icon to enable an application program corresponding to the icon. For example, the common application program tray 113 may include a camera application icon, a contacts application icon, a phone application icon, and a message application icon. The general application program tray 114 may include a setting application icon, an application market application icon, a gallery application icon, a browser application icon, and the like. Not limited to the foregoing icons, the homepage may further include other application program icons, which are not listed herein. An icon of any application program may be placed on the common application program tray 113 or the general application program tray 114.

A plurality of application program icons may be distributed on a plurality of pages. The page indicator 112 may indicate a positional relationship between a currently displayed page and another page. The user may view the another page through a touch operation of a left slide/right slide. The application program icons borne in the common application program tray 113 do not change with the page, that is, are fixed. However, the application program icons borne in the general application program tray 114 change with the page.

It may be understood that the user interfaces in FIG. 1A and described subsequently merely exemplarily show a possible style of a user interface of the electronic device 100 by using a mobile phone as an example, and do not constitute a limitation on embodiments of this application.

When the user interface shown in FIG. 1A is displayed, the electronic device 100 may detect a user operation performed on the camera application icon. The user operation is, for example, a tap operation. In response to the user operation, the electronic device 100 may run a camera application, and the electronic device 100 may display a main interface of the camera application on a screen. The camera application is an application program installed on the electronic device 100 that can invoke the camera to provide the shooting service. Not limited to the camera application, other application programs that may be installed on the electronic device 100 and provide the shooting service by invoking the camera may also implement the shooting mode recommendation method provided in this application. This is not limited in embodiments of this application.

Figure 1B:
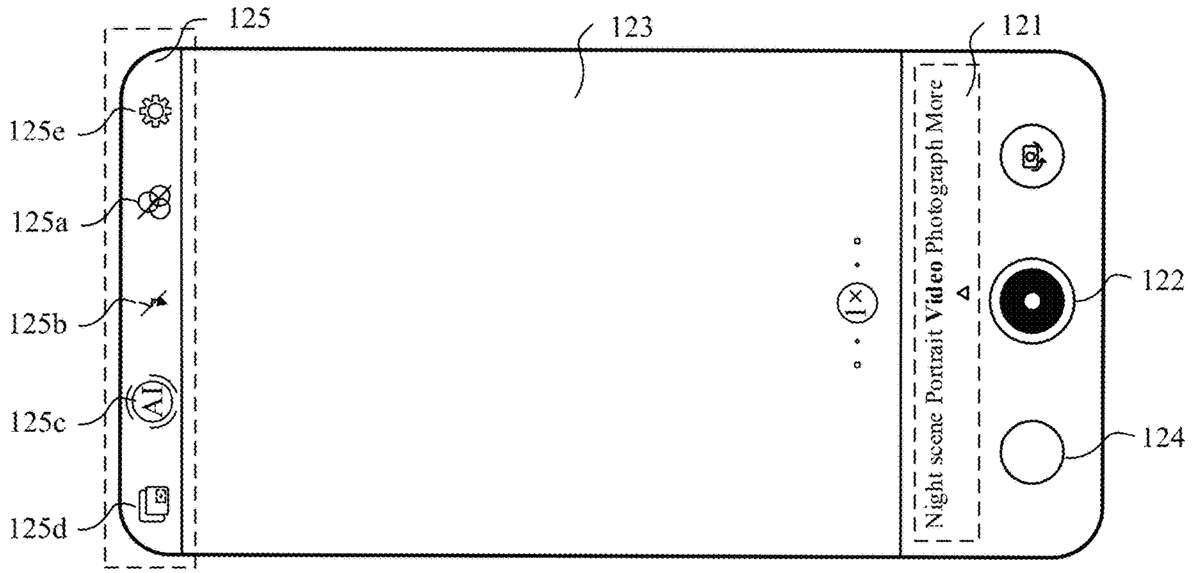

FIG. 1B shows the main interface (a first preview interface) of the camera application according to an embodiment of this application. As shown in FIG. 1B, the main interface of the camera application may include a menu bar 121, a shooting control 122, a preview window 123, and a playback control 124.

A plurality of shooting mode options may be displayed in the menu bar 121, for example, options such as "Night scene", "Portrait", "Photograph", and "Video". The "Photograph" option corresponds to a default shooting mode for shooting photos, and is denoted as an ordinary photograph mode. The "Video" option corresponds to a default mode for video recording, and is denoted as an ordinary video recording mode. The "Night scene" option corresponds to a night scene mode, and is applicable to a shooting scene with dark light, for example, at night. The "Portrait" option corresponds to a portrait mode, and is applicable to shooting a person. The camera application may further include more shooting modes, for example, a high dynamic range mode applicable to an overexposure scene, a macro mode applicable to close-up shooting, and the like. The user may obtain more shooting modes through a "More" control in the menu bar 121, to satisfy personalized shooting requirements of the user.

Each time the camera application is enabled, the electronic device 100 may select a specific shooting mode by default, for example, the ordinary photograph mode. Optionally, the electronic device 100 may alternatively select a shooting mode used when the camera application is exited last time. This is not limited in embodiments of this application. As shown in FIG. 1B, a currently selected shooting mode is the ordinary video recording mode. Therefore, the user interface shown in FIG. 1B is also referred to as a preview interface (a recorded video preview interface) of the ordinary video recording mode. When the ordinary photograph mode is selected, a preview interface corresponding to the ordinary photograph mode may be referred to as a photograph preview interface.

The preview window 123 may be configured to display an image reported by the camera in real time. The shooting control 122 may be configured to receive a shooting operation of the user. After detecting a user operation performed on the shooting control 122, the electronic device 100 may start video recording, that is, start encoding an image frame sequence (that is, an image stream) reported by the camera.

After recording ends, the electronic device 100 may encapsulate the encoded image stream into a video and store the video into a memory of the electronic device 100. The electronic device 100 may generate a frame of thumbnail based on the stored video. The playback control 124 may display the thumbnail, and is configured to prompt the user that the video recording has ended and the video has been stored. Then, the user may view the stored video at any time.

The user interface shown in FIG. 1B may further include a setting bar 125. The setting bar 125 may include a plurality of setting controls configured to adjust shooting parameters. For example, the setting bar 125 may include a filter control 125*a*, a flash light control 125*b*, an automatic follow control 125*c*, a protagonist mode control 125*d*, and a control 125*e* for the user to obtain more setting options. The filter control 125*a* may be configured to select a filter. The camera application may render, based on a selected filter type, an image reported by the camera, to provide the user with a photo or a video with a specific picture effect. The flash light control 125*b* may be configured to turn on or off a flash light, to change illuminance of a shooting scene and increase or decrease image illuminance. The automatic follow control 125*c* may be configured to set automatically following a shooting subject. The protagonist mode control 125*d* may be configured to enable a protagonist mode, to shoot and store two videos: a panoramic video obtained based on a panoramic image displayed in the preview window and a protagonist video obtained by cropping a protagonist in a panoramic image in the preview window.

The electronic device 100 may determine feature information in the image reported by the camera. Then, the electronic device 100 may determine, based on feature information of each frame of image, a shooting mode that best matches a current shooting scene, and then recommend the shooting mode to the user.

Figure 1C:
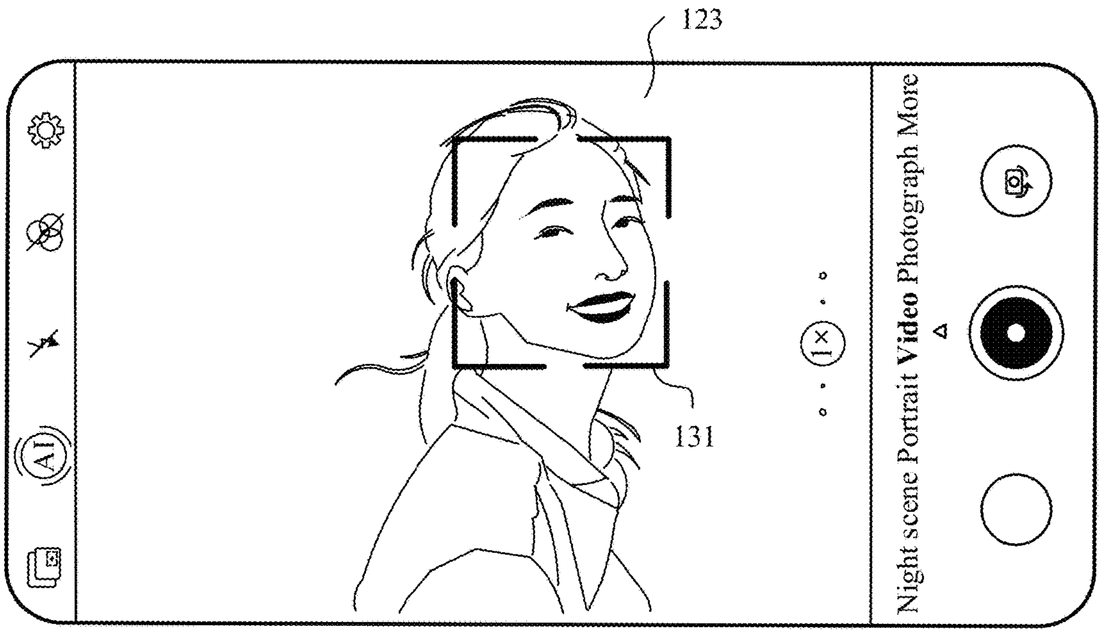

As shown in FIG. 1C, the electronic device 100 may determine, based on the feature information of the image reported by the camera, that the image includes a human face. Optionally, when a human face is detected, the electronic device 100 may display a detection box 131 on a human face region in the image, which is configured to prompt the user that a human face is recognized.

When the electronic device 100 detects, within a continuous period of time, that the image includes a human face, and an area of a region occupied by the human face in the image is greater than a preset threshold, the electronic device 100 may determine that the user performs close-up person shooting. In this case, the electronic device 100 may determine the portrait mode that best matches this case. The continuous period of time may be referred to as an entry period. Duration of the entry period is, for example, 0.5 seconds or 1 second. It may be understood that specific duration of the entry period may be set by a developer based on experience, and this is not limited in embodiments of this application.

Optionally, another condition may be further set in the electronic device 100. For example, the image illuminance satisfies a threshold condition, or an image zoom ratio is within a preset zoom ratio change interval. When the another condition is satisfied, the electronic device 100 redetermines that the portrait mode is matched.

Figure 1D:
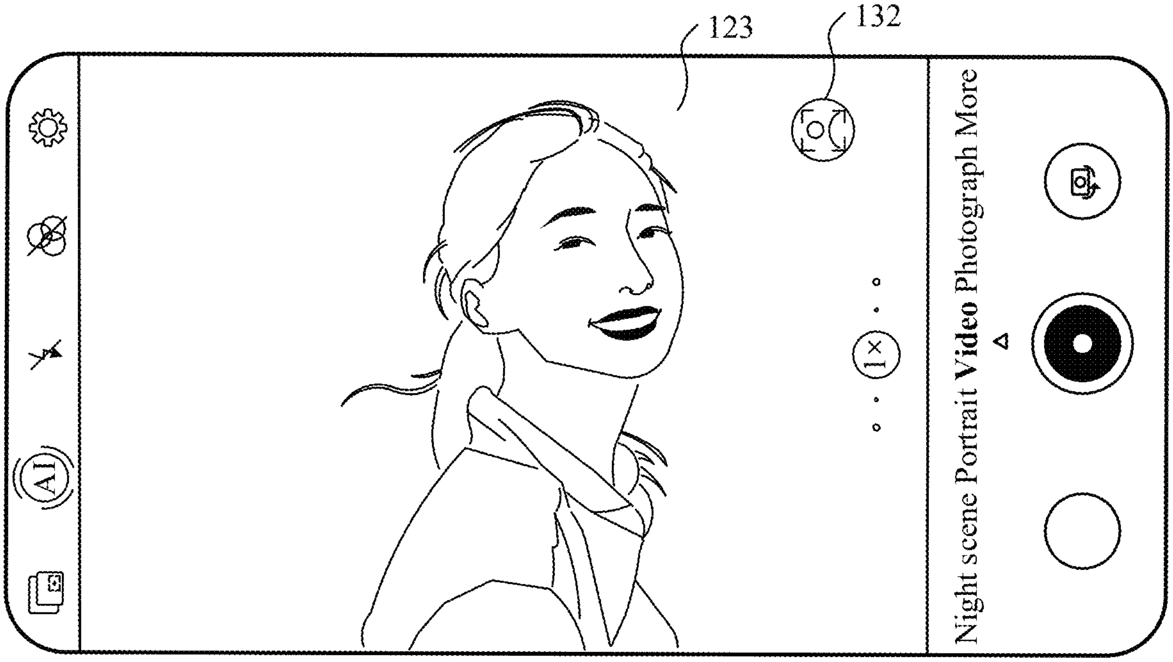
Figure 1E:
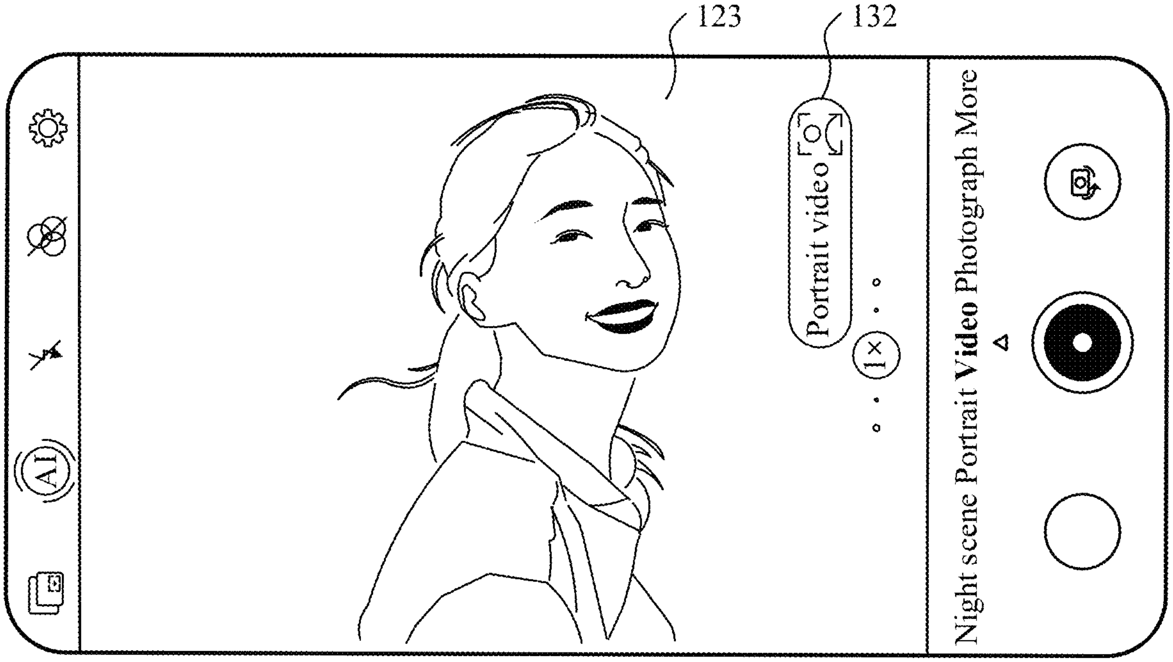

Referring to FIG. 1D, after determining to recommend the portrait mode, the electronic device 100 may display a control 132 in the preview window 123. A portrait icon may be displayed in the control 132, indicating that the shooting mode recommended by the electronic device 100 in the current scene is the portrait mode. The control 132 may be referred to as a portrait recommendation tag. Referring to FIG. 1E, the electronic device 100 may further carry text prompt information, for example, "Portrait video", on the control 132 in an animation playing manner, so that the user can more directly determine a type of the shooting mode recommended by the electronic device 100. The user may enter the portrait mode through an operation of tapping on the control 132, and then shoot in the shooting mode.

If a user operation performed on the control 132 is not detected, the electronic device 100 may stop recommending the portrait mode, and stop displaying the control 132 indicating the portrait mode in the preview window 123. The continuous period of time (first preset time) may be referred to as an exit period. Duration of the exit period is, for example, 0.5 seconds or 1 second. The duration of the exit period may be the same as or different from the duration of the entry period. Similarly, the duration of the exit period may also be set by the developer based on experience, and this is not limited in embodiments of this application. Optionally, if none of images reported by the camera includes a human face within a continuous period of time (a third time period), the electronic device 100 may also stop recommending the portrait mode, and stop displaying the control 132 indicating the portrait mode in the preview window 123. Preferably, duration corresponding to the first preset time is the same as duration corresponding to the third time period.

Figure 1F:
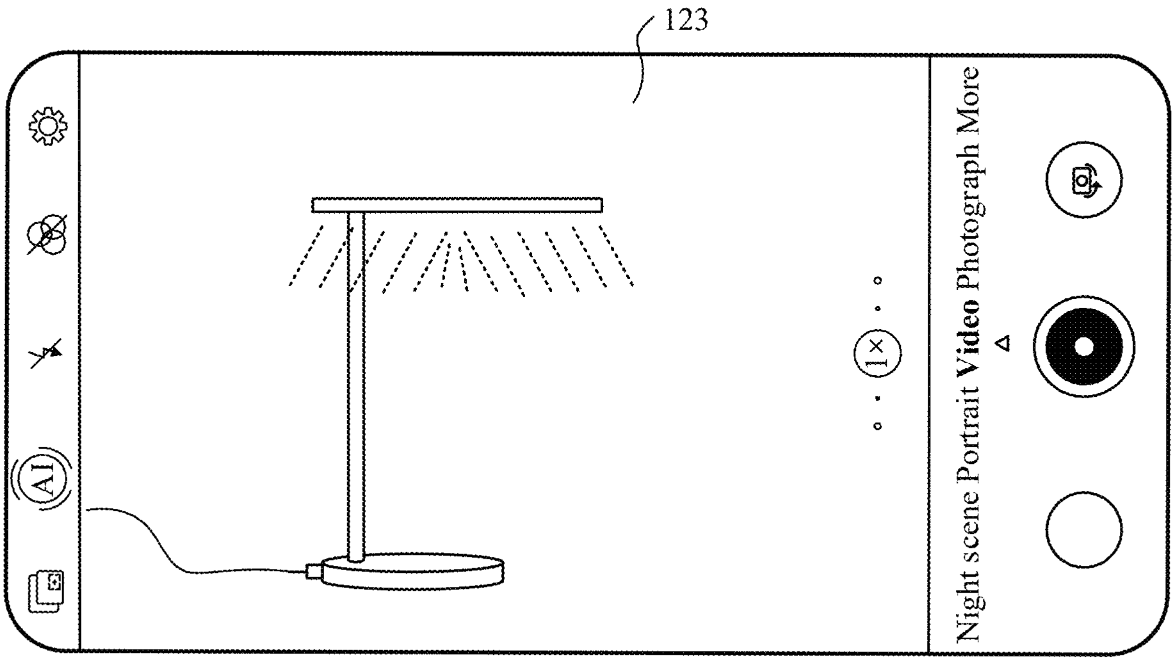

Referring to FIG. 1F, after recommendation of the portrait mode is stopped, the control 132 is no longer displayed in the preview window 123. The image reported by the camera (that is, the image displayed in the preview window 123 at this time) no longer includes a human face.

In some other examples, the electronic device 100 may alternatively display the control 132 fixedly for a period of time, for example, 3 seconds or 5 seconds. If the electronic device 100 does not detect a user operation performed on the control 132 after the foregoing display time expires, the electronic device 100 may also stop recommending the portrait mode.

In a process of detecting that the image reported by the camera does not include a human face, the electronic device 100 may obtain other feature information from the image. Referring to an image shown in the preview window 123 in FIG. 1F (where a table lamp in the image causes brightness of pixels in a part of a region of the image to be higher than a preset threshold, leading to overexposure), the electronic device 100 may determine an overexposure shooting scene based on illuminance of the image.

After detecting, within a continuous period of time, that overexposure exists in the image reported by the camera, the electronic device 100 may determine that the user performs high-exposure shooting. In this case, the electronic device 100 may determine a high dynamic range mode that best matches the high-exposure shooting. The continuous period of time is an entry period. Entry periods of different modes may be the same or may be different.

Figure 1G:
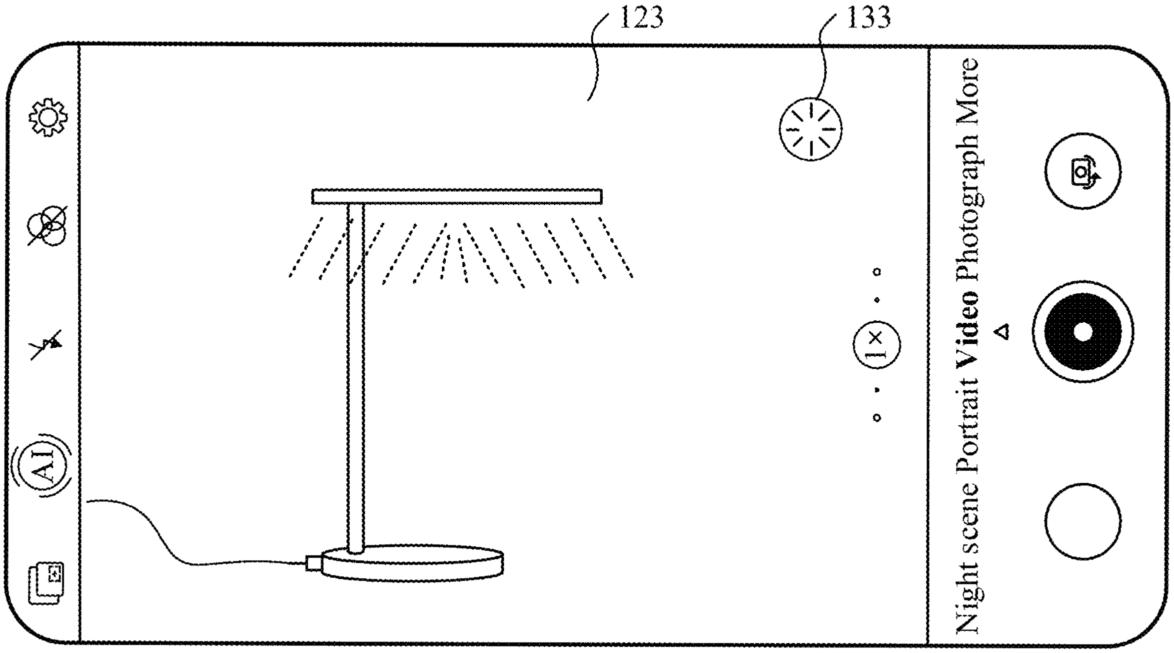
Figure 1H:
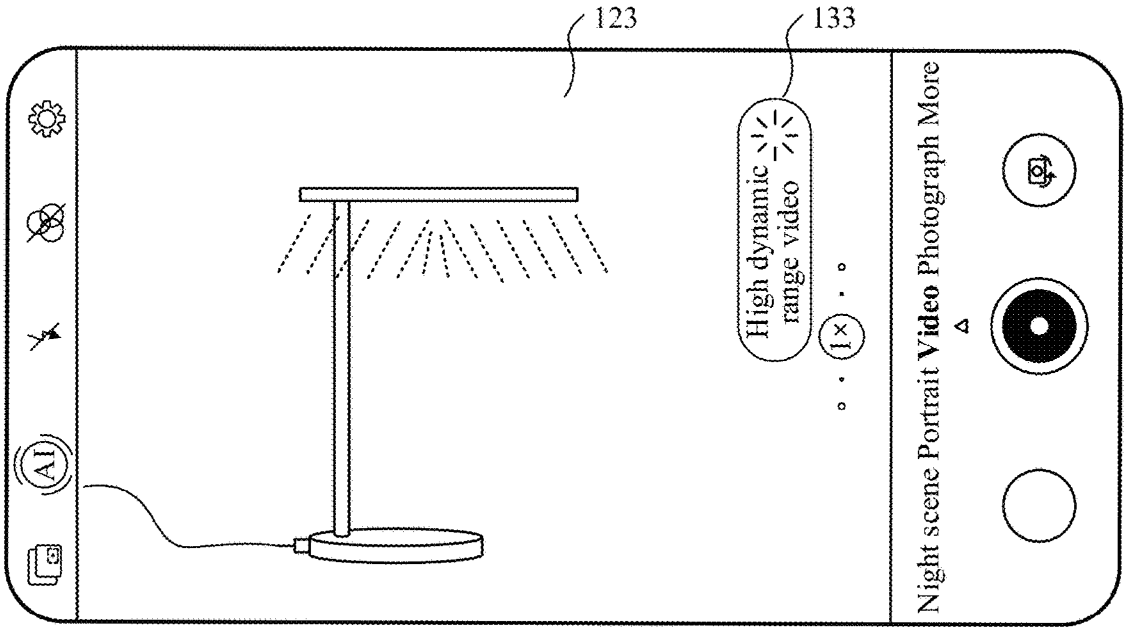

Referring to FIG. 1G, after determining to recommend the high dynamic range mode, the electronic device 100 may display a control 133 in the preview window 123. A light icon may be displayed in the control 133, indicating that a shooting mode recommended by the electronic device 100 in the current scene is the high dynamic range mode. The control 133 may be referred to as a high dynamic range recommendation tag. Similarly, referring to FIG. 1H, the electronic device 100 may further carry text prompt information, for example, "High dynamic range video", on the control 133 in the animation playing manner, so that the user can more directly determine the type of the shooting mode recommended by the electronic device 100. The user may enter the high dynamic range mode through an operation of tapping on the control 133, and then shoot in the shooting mode.

Similarly, if overexposure does not exist in the images reported by the camera within the continuous period of time (second preset time/the third time period), and a user operation performed on the control 133 is not detected, the electronic device 100 may stop recommending the high dynamic range mode, and stop displaying the control 133 indicating the high dynamic range mode in the preview window 123. The continuous period of time is an exit period. Exit periods of different modes may be the same or may be different. Similarly, the electronic device 100 may alternatively display the control 133 fixedly for a period of time. If the electronic device 100 does not detect the user operation performed on the control 133 after the foregoing display time expires, the electronic device 100 may also stop recommending the high dynamic range mode.

Not limited to a close-up person shooting scene and a high-exposure shooting scene shown in FIG. 1C to FIG. 1H. The electronic device 100 may further determine another specific shooting scene based on the feature information of the image reported by the camera, for example, a night scene shooting scene, a close-up shooting scene, a protagonist track shooting scene, or a multi-lens shooting scene. Correspondingly, the electronic device 100 determines a shooting mode matching each scene, and then recommends the shooting mode to the user. For example, after determining that the user is performing night scene shooting, the electronic device 100 may display a control corresponding to the night scene mode, and recommend the night scene mode to the user; or after determining that the user is performing close-up shooting, the electronic device 100 may display a control corresponding to the macro mode, and recommend the macro mode to the user, which are not listed herein.

Referring to descriptions of the user interfaces shown in FIG. 1A to FIG. 1H, by implementing the shooting mode recommendation method provided in embodiments of this application, the electronic device 100 may determine a current shooting scene in real time based on feature information of the image generated by the camera in a preview process, and then recommend a shooting mode matching the current scene to the user. The user may quickly enter the shooting mode recommended by the electronic device 100 through a corresponding recommendation tag displayed in the electronic device 100, so that the user can obtain better shooting experience. In addition, the user does not need to determine which shooting mode is used to obtain a better shooting effect, and does not need to look for an entrance to a corresponding mode.

FIG. 2A to FIG. 2H show a group of user interfaces of entering a specific mode through recommendation for shooting according to an embodiment of this application.

The user interface shown in FIG. 1D is used as an example. The electronic device 100 may detect a user operation performed on the control 132. The control 132 corresponds to the portrait mode. In response to the operation, the electronic device 100 may enable the portrait mode. Compared with an ordinary video recording mode, when the portrait mode is enabled, the electronic device 100 can recognize a human face in an image, optimize the human face, and output an image with a better face effect.

Figure 2A:
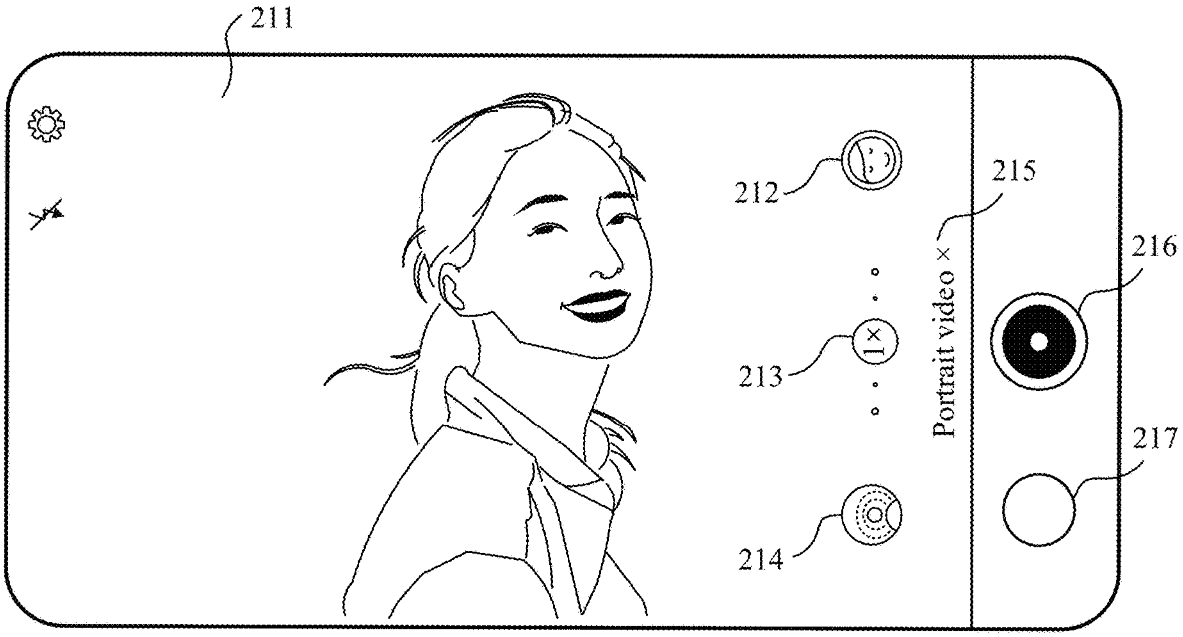
FIG. 2A to FIG. 2H show a group of user interfaces of entering a specific mode through recommendation for shooting according to an embodiment of this application.

After the portrait mode is enabled, the electronic device 100 may display the user interface shown in FIG. 2A. The user interface may include a preview window 211. The preview window 211 may display an image reported by the camera after portrait optimization in real time.

The user interface further includes a beauty control 212, a zoom control 213, and a blur control 214. The beauty control 212 may be configured to adjust a beauty degree of a face image in the image. The zoom control 213 may be configured to adjust a zoom ratio and change viewing ranges of a camera lens and/or the preview window 211. The blur control 214 may be configured to adjust a background blur degree. A higher background blur degree indicates a more prominent effect of a portrait.

Figure 2B:
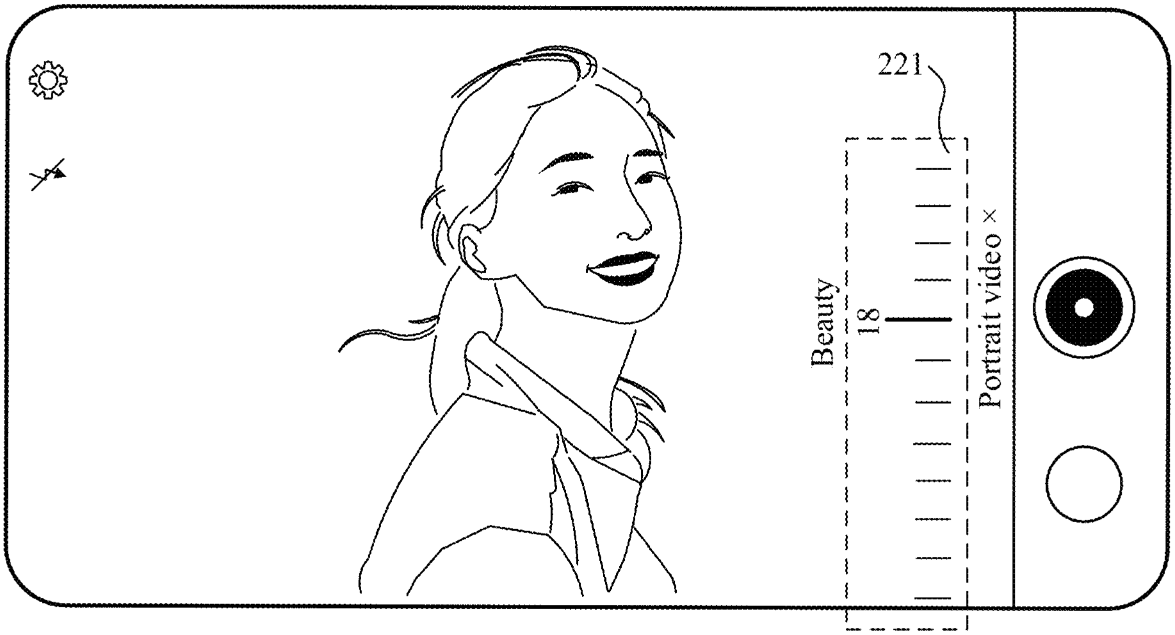

When detecting a user operation performed on the beauty control 212, in response to the operation, the electronic device 100 may display a user interface shown in FIG. 2B. In the user interface shown in FIG. 2B, a control 221 is displayed in the preview window 211. The control 221 may be configured to set a beauty degree, for example, 18. The user may increase or decrease a current beauty degree through a slide-up or slide-down operation (in a horizontal-screen shooting scene) of dragging the control 221. In a longitudinal-screen shooting scene, the user may increase or reduce the current beauty degree through a slide-left or slide-right operation of dragging the control 221.

Figure 2C:
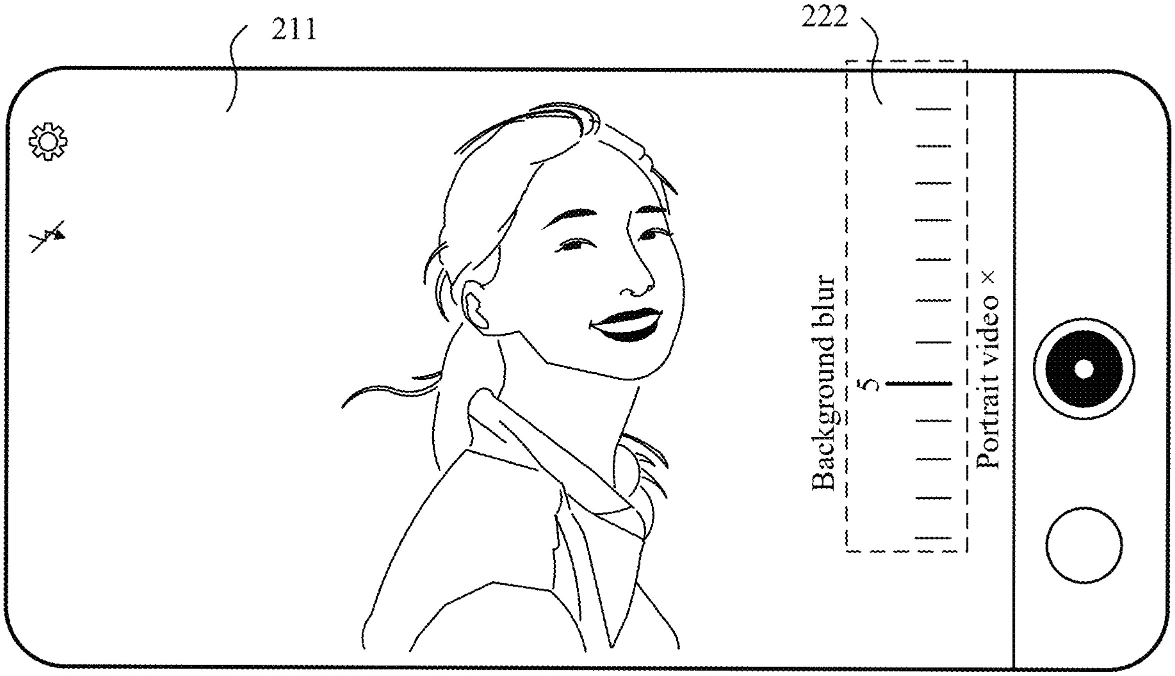
Figure 2D:
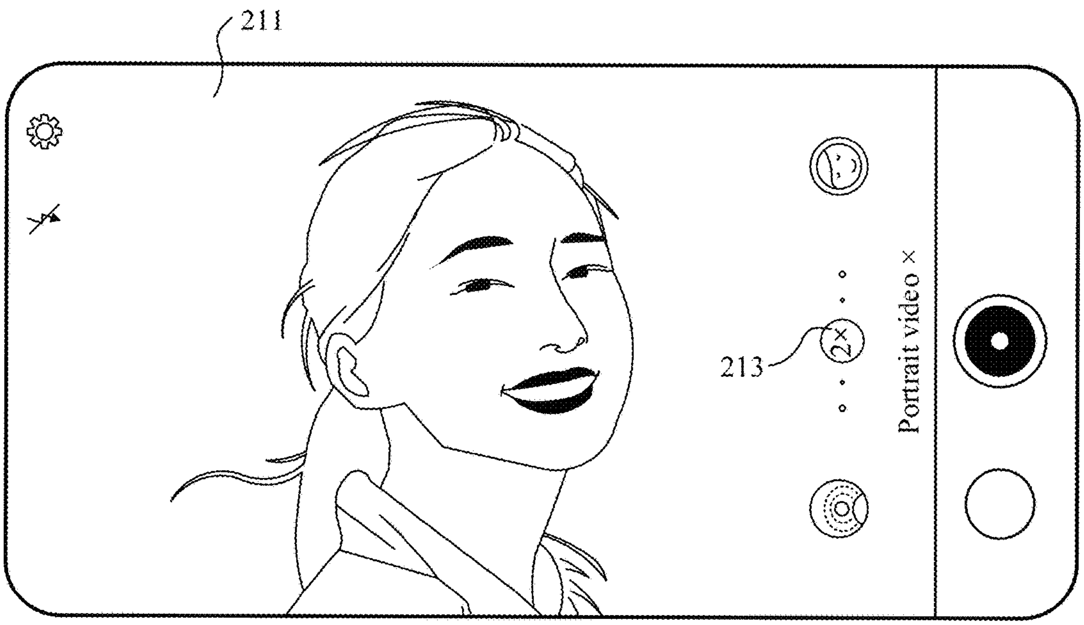

When detecting a user operation performed on the blur control 214, in response to the operation, the electronic device 100 may display a user interface shown in FIG. 2C. In the user interface shown in FIG. 2C, a control 222 is displayed in the preview window 211. The control 222 may be configured to set a background blur degree, for example, 5. The user may increase or decrease a current background blur degree through a slide-up or slide-down operation (in a horizontal-screen shooting scene) dragging the control 222.

The user can adjust the zoom ratio through the zoom control 213 to perform physical zooming or digital zooming. After detecting a user operation of increasing the zoom ratio (from 1× to 2×) performed on the zoom control 213, in response to the operation, the electronic device 100 may display a user interface shown in FIG. 2D. In this case, the zoom control 213 may display an adjusted zoom ratio, for example, 2×. An image in the preview window 211 is an image corresponding to 2×.

The user interface shown in FIG. 2A may further include a disabling control 215 ("x"). After detecting a user operation performed on the disabling control 215, in response to the user operation, the electronic device 100 may exit the portrait mode and return to the ordinary video recording mode. For example, the electronic device 100 may redisplay the user interface shown in FIG. 1C.

The user interface shown in FIG. 2A further includes a shooting control 216 and a review control 217. For the shooting control 216 and the review control 217, reference may be made to the shooting control 122 and the review control 124 in FIG. 1B respectively. Details are not described herein again.

Figure 2E:
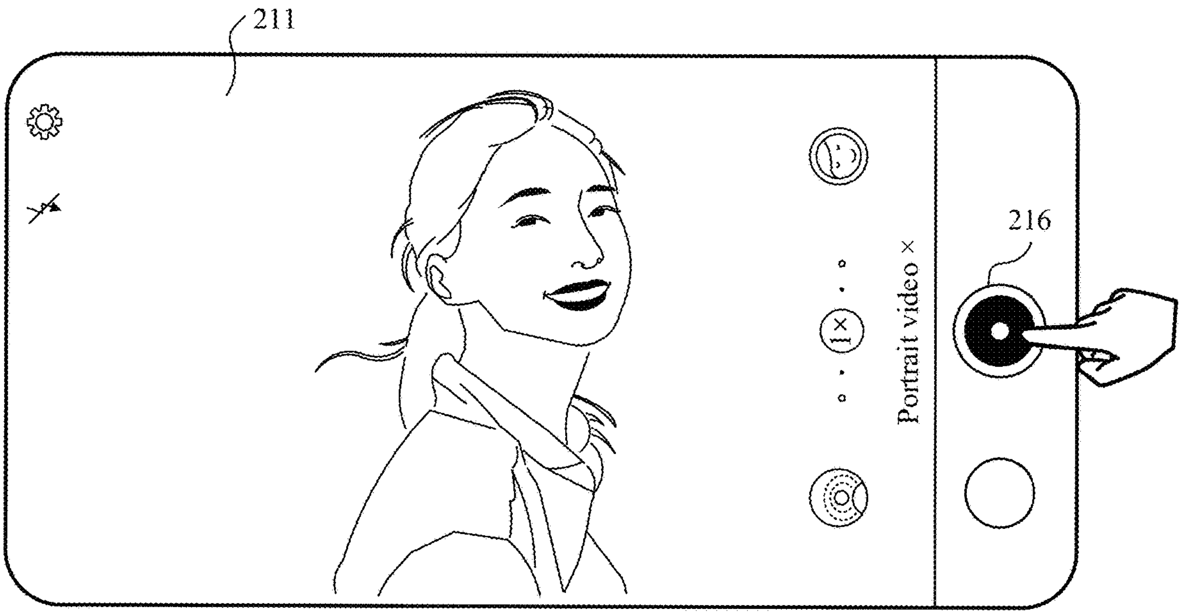
Figure 2F:
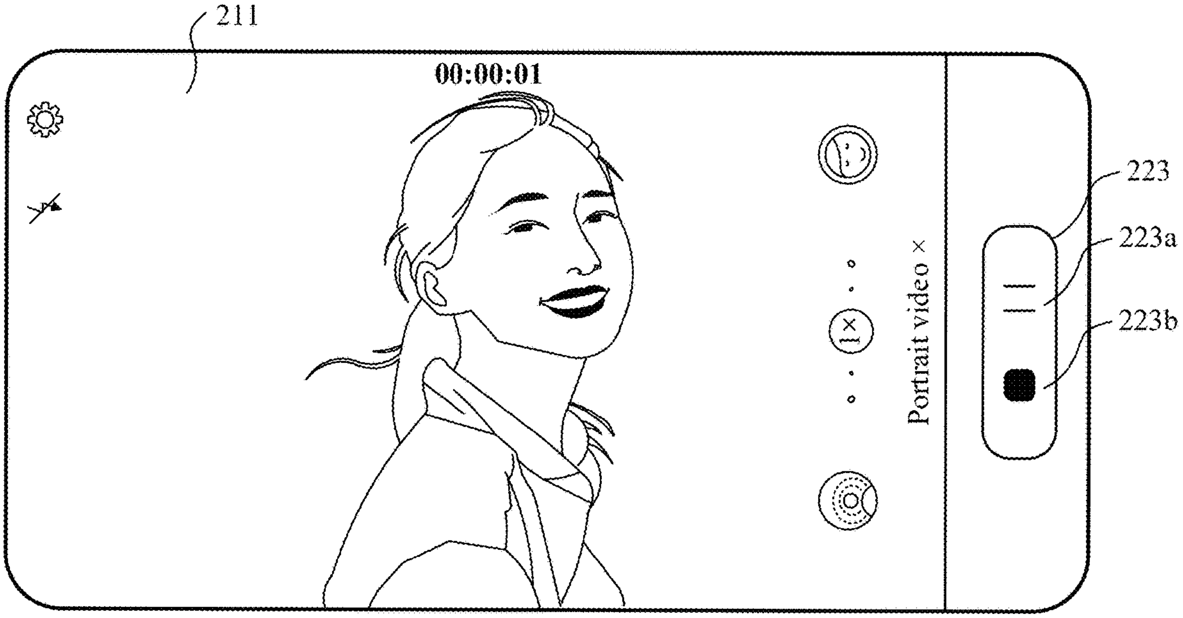

Referring to FIG. 2E, after entering the portrait mode, in the preview process, the electronic device 100 may detect a user operation performed on the shooting control 216. In response to the operation, the electronic device 100 may start video recording. The electronic device 100 may display a user interface shown in FIG. 2F. As shown in FIG. 2F, the electronic device 100 may display a control group 223 in replacement of the shooting control 216. The control group 223 may include a shooting control 223*a* and a shooting control 223*b*. The shooting control 223*a* may be configured to suspend video recording. The shooting control 223*b* may be configured to stop video recording. The preview window 211 may further display a recording time, for example, "00:00:01", for prompting the user for duration for which the video has been recorded.

After detecting a user operation performed on the shooting control 223*a*, the electronic device 100 may suspend encoding the image reported by the camera after portrait optimization. In this case, the preview window 211 continues to display the image reported by the camera after portrait optimization in real time. In this case, the recording time is suspended, indicating to the user that recording is suspended.

Figure 2G:
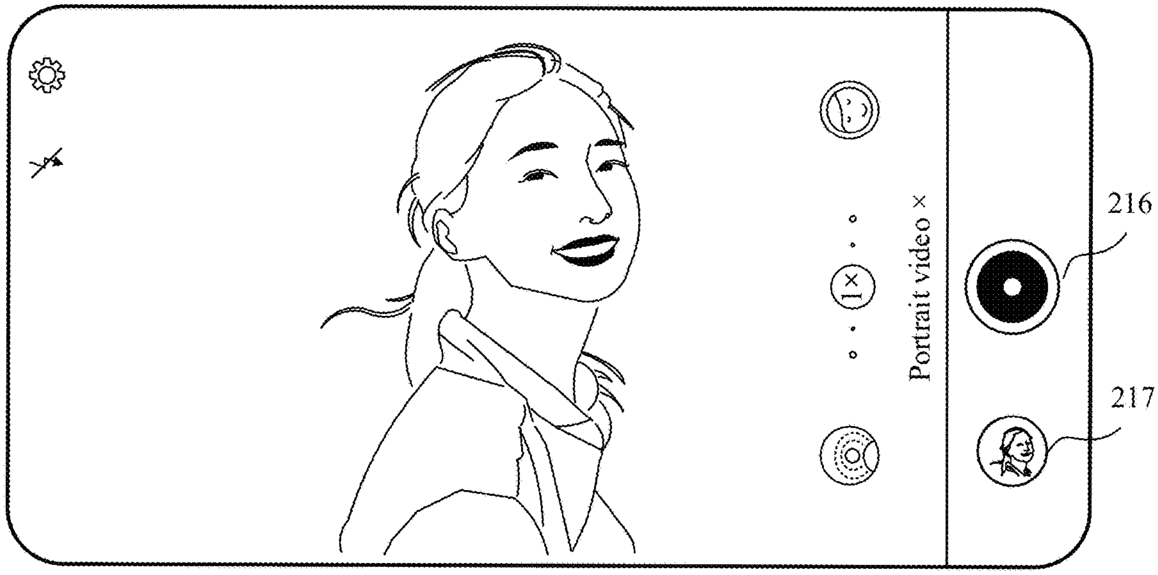

After detecting a user operation performed on the shooting control 223*b*, the electronic device 100 may stop encoding the image reported by the camera after portrait optimization, and encapsulate an encoded image stream into a video and store the video into a memory of the electronic device 100. In addition, the electronic device 100 may display a user interface shown in FIG. 2G. As shown in FIG. 2G, the electronic device 100 may re-display the shooting control 216 in replacement of the control group 223. In addition, the electronic device 100 may display a thumbnail corresponding to the video on the review control 217, to remind the user that the recording ends and a recorded video is saved. Further, the user can view a shot video at any time through the review control 217.

The user interface shown in FIG. 1G is used as an example. When the electronic device 100 recommends the high dynamic range mode to the user, the electronic device 100 may detect a user operation performed on the control 133. In response to the operation, the electronic device 100 may enable the high dynamic range mode. Compared with an ordinary video recording mode, when the high dynamic range mode is enabled, the electronic device 100 may perform exposure compensation on overexposed pixels, to reduce an exposure proportion of the image, and improve visual perception of the image.

Figure 2H:
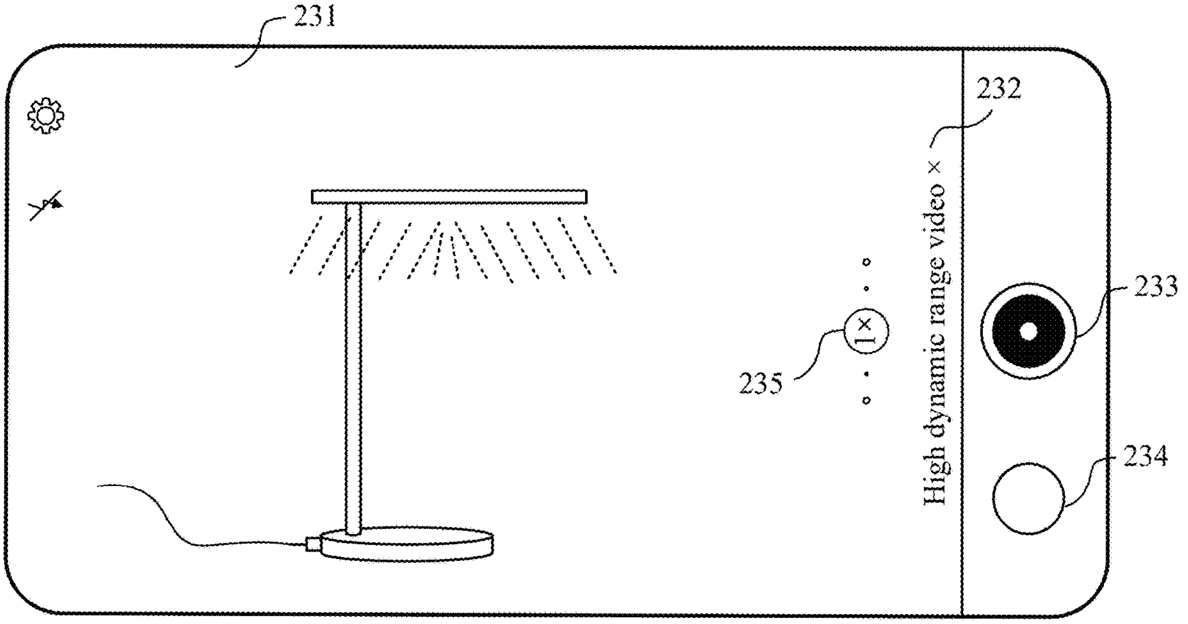

When the high dynamic range mode is enabled, the electronic device 100 may display a user interface shown in FIG. 2H. The user interface may include a preview window 231. The preview window 231 may display an image reported by the camera after exposure compensation in real time. The user interface further includes a disabling control 232, a shooting control 233, a review control 234, and a zoom control 235. For the controls, reference may be made to the descriptions of FIG. 2A, and details are not described herein again. After detecting a user operation performed on the shooting control 233, the electronic device 100 may start video recording. The image in the video is an image after exposure compensation processing in the high dynamic range mode.

With reference to the portrait shooting scene and the high-exposure shooting scene described above, through the shooting mode recommendation method provided in embodiments of this application, the user can quickly and conveniently obtain a shooting mode that best matches a current shooting scene, thereby improving picture quality of a video or a photo, and improving user shooting experience.

In some embodiments, the image reported by the camera may correspond to a plurality of types of shooting scenes at the same time. In this case, the electronic device 100 may match a plurality of shooting modes based on the plurality of types of shooting scenes.

In an optional implementation, the electronic device 100 may create priorities of mode recommendations. After matching the plurality of shooting modes at the same time, the electronic device 100 may recommend, based on priorities of the plurality of matched shooting modes, a shooting mode with a higher priority to the user.

Figure 3A:
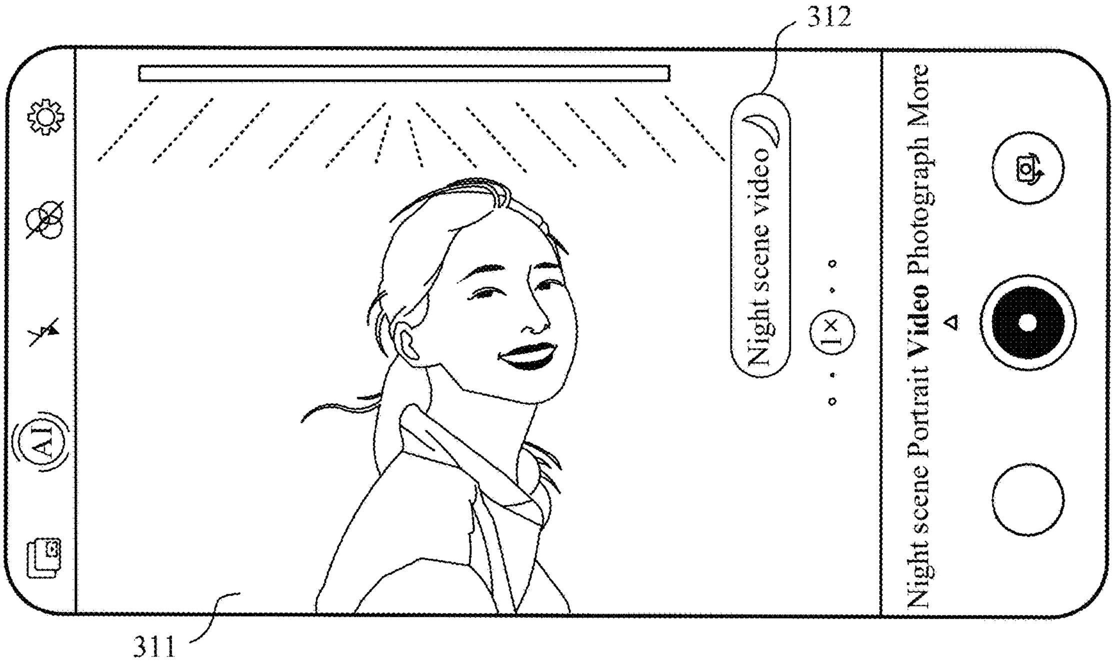
FIG. 3A to FIG. 3G show another group of user interfaces of recommending a shooting mode according to an embodiment of this application.

Referring to FIG. 3A, in this case, an image displayed in a preview window 311 may be a portrait under a light post at night. In this case, the image has a characteristic of overexposure and includes a human face, and illuminance of the image is excessively low (that is, in a dim environment). In this case, based on the characteristic of overexposure, the electronic device 100 may match to a high dynamic range mode. Based on the human face, the electronic device 100 may match to a human face video recording mode. Based on dark ambient light, the electronic device 100 may match to a night scene mode.

In this case, the electronic device 100 may determine an optimal shooting mode from the plurality of matched shooting modes based on preset recommendation priorities of the modes, and then recommend the optimal shooting mode to the user. For example, shooting modes supported by the camera application in the electronic device 100 may include: a macro mode, a night scene mode, a portrait mode, a high dynamic range mode, a protagonist mode, and a multi-lens mode. Recommendation priorities of the modes decrease in sequence: the macro mode has a highest priority, and the multi-lens mode has a lowest priority. When the electronic device 100 matches the high dynamic range mode, the portrait mode, and the night scene mode at the same time, based on the preset priorities, the electronic device 100 may determine that the night scene mode is a preferred shooting mode in a current composite shooting scene. Therefore, the electronic device 100 may display a control 312 in the preview window 311. The control 312 corresponds to the night scene mode. The user may enter the night scene mode by tapping on the control 312. It may be understood that a developer may set the priorities of the shooting modes based on experience, to obtain different recommendation results. This is not listed herein.

In this way, in a complex shooting scene, the user can also quickly obtain a shooting mode most adapted to the current shooting scene, and quickly enter the mode for shooting. This both reduces selection costs of the user and reduces user operations, so that the shooting experience of the user is improved.

In another optional implementation, the electronic device 100 may recommend the plurality of matched shooting modes to the user at the same time. The user may select any shooting mode recommended by the electronic device 100 for shooting according to needs of the user.

Figure 3B:
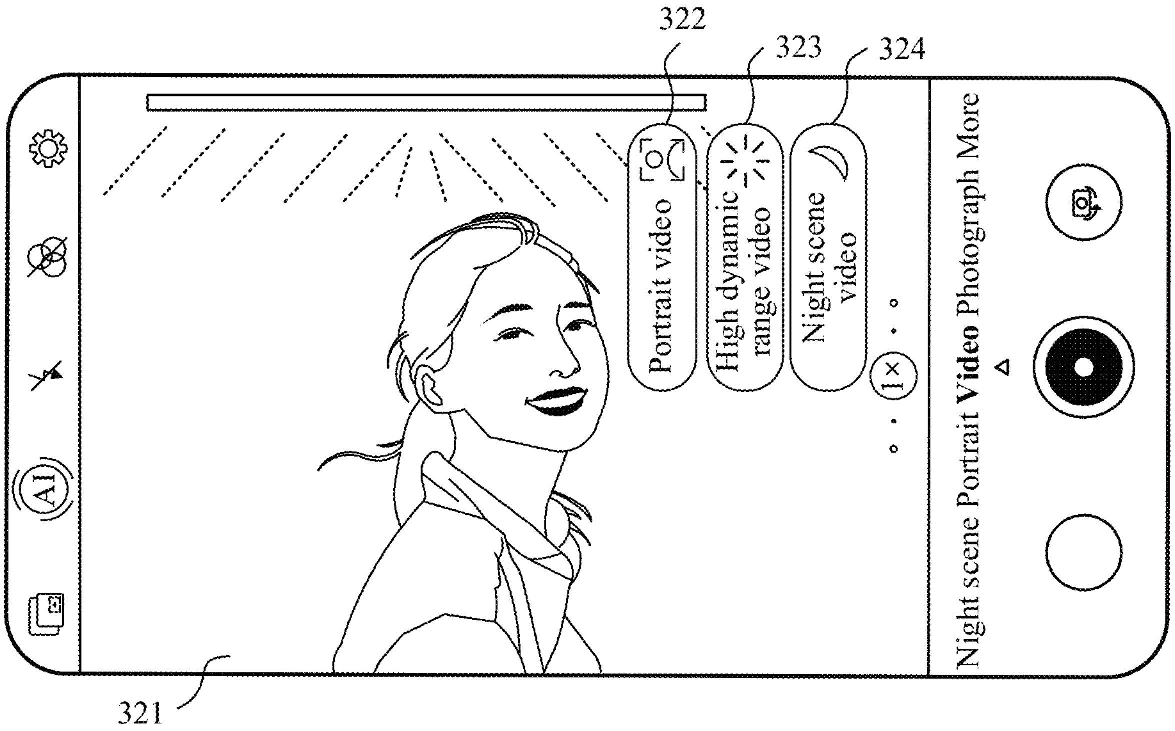

Referring to FIG. 3B, after matching the high dynamic range mode, the portrait mode, and the night scene mode at the same time, the electronic device 100 displays a control 322, a control 323, and a control 324 in a preview window 321. The control 322 corresponds to the portrait mode, the control 323 corresponds to the high dynamic range mode, and the control 324 corresponds to the night scene mode. In this case, the user may tap on any one of the controls to enter a shooting mode corresponding to the control for shooting. For example, when detecting a user operation performed on the control 322, the electronic device 100 may enter the portrait mode, referring to FIG. 2A.

Through the method provided in the foregoing embodiment, after matching the plurality of shooting modes, the electronic device 100 may recommend the plurality of matched shooting modes to the user at the same time, for the user to select a proper shooting mode from the plurality of shooting modes. In this way, while convenient operations are provided for the user, personalization needs of the user are further satisfied.

Optionally, the electronic device 100 may further support the user in selecting a plurality of recommended shooting modes. After the plurality of recommended shooting modes are selected, the electronic device 100 may display shooting effects corresponding to the modes at the same time. After comparing the plurality of recommended shooting modes, the user may select a shooting mode that best meets an individual need, and then the user may enter the mode for shooting.

Figure 3C:
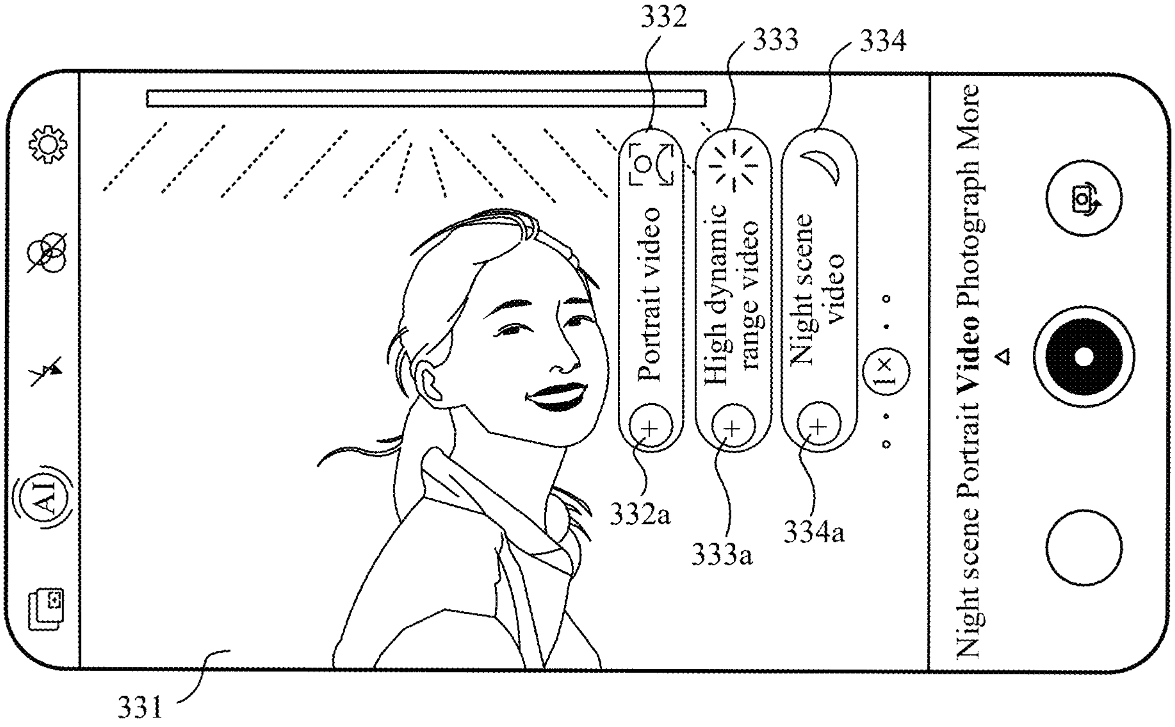

Referring to FIG. 3C, after matching the high dynamic range mode, the portrait mode, and the night scene mode at the same time, the electronic device 100 displays a control 332, a control 333, and a control 334 in a preview window 331. The control 332, the control 333, and the control 334 each include a check control with a plus sign ("+"), for example, a control 332*a*, a control 333*a*, and a control 334*a*. The control 332*a* corresponds to the control 332, the control 333*a* corresponds to the control 333, and the control 334*a* corresponds to the control 334. The user may perform multi-selection through the control 332*a*, the control 333*a*, and the control 334*a*, to select a plurality of recommended shooting modes at the same time.

Figure 3D:
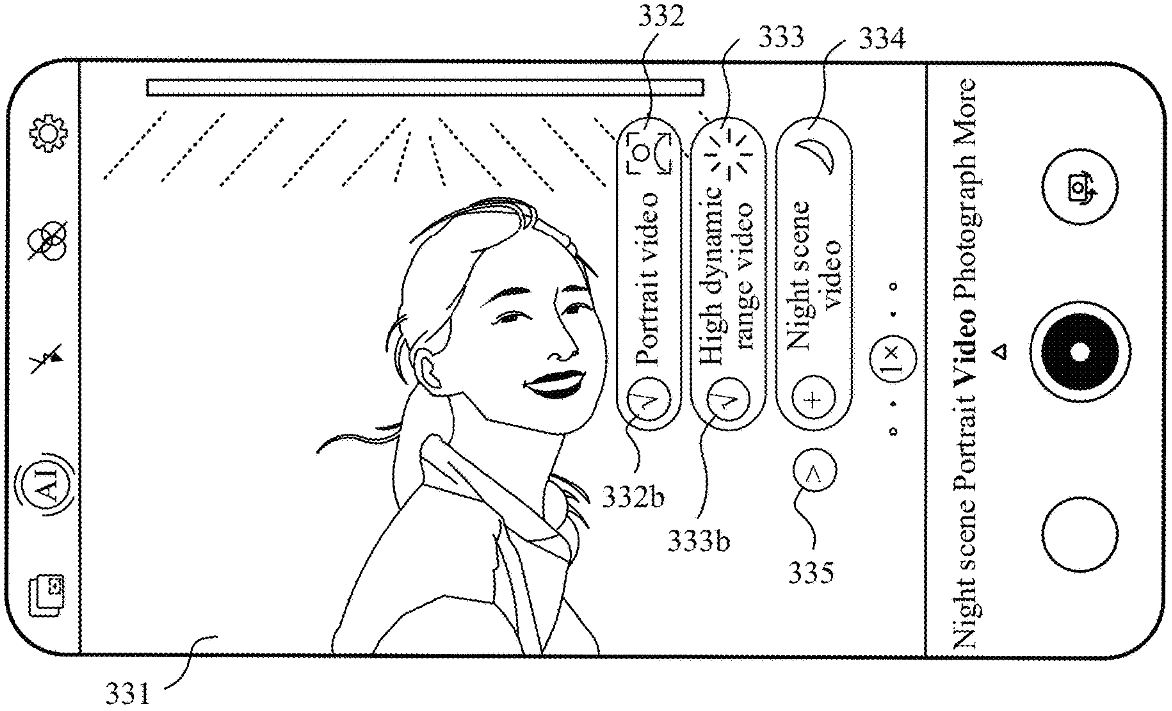

After determining the plurality of shooting modes selected by the user, the electronic device 100 may display shooting effects corresponding to the modes at the same time. For example, after detecting user operations performed on the control 332*a* and the control 333*a*, the electronic device 100 may display a user interface shown in FIG. 3D. As shown in FIG. 3D, the electronic device 100 may replace the control 332*a* with the control 332*b* ("V"), and replace the control 333*a* with the control 333*b*, to indicate that the user selects the portrait mode and the high dynamic range mode corresponding to the control 332*b* and the control 333*b* in the recommended high dynamic range mode, portrait mode, and night scene mode.

After detecting at least one user operation of selecting a shooting mode, the electronic device 100 may further display a control 335. The control 335 may be configured to determine one or more selected shooting modes. After determining the selected one or more shooting modes, the electronic device 100 may display shooting effects corresponding to the one or more shooting modes at the same time, for the user to compare and select a shooting mode that best meets the needs of the user.

For example, after detecting a user operation performed on the control 335, the electronic device 100 may determine that the selected shooting modes includes: the portrait mode and the high dynamic range mode respectively corresponding to the control 332*b* and the control 333*b*. Then, the electronic device 100 may display a user interface shown in FIG. 3E. The interface may include a window 341 and a window 342. The window 341 may be configured to display an image reported by the camera after portrait optimization. The window 342 may be configured to display an image reported by the camera after exposure compensation. The user may tap on any window to enter a shooting mode corresponding to the window for shooting.

Prompt information, such as "Portrait video", is further displayed in the window 341, to indicate a shooting mode corresponding to the image displayed in the window 341. The prompt information may further include a control 343 ("×"), configured to exit the portrait mode, referring to the description of the disabling control 215 in FIG. 2A. Details are not described herein again. Similarly, prompt information, for example, "High dynamic range video" may further be displayed in the window 342, to indicate a shooting mode corresponding to the image displayed in the window 342. A control 344 ("×") is also set in the prompt information, to exit the high dynamic range mode.

In this way, when the electronic device 100 recommends the plurality of shooting modes at the same time, the user may preview specific effects of the shooting modes, thereby facilitating the user observing a shooting effect corresponding to a mode that is more suitable for the needs of the user. In this way, the user can more directly and clearly determine which shooting mode to select from the recommended shooting modes for shooting.

Optionally, when recommending a plurality of shooting modes, the electronic device 100 may further support the user in one-button previewing a shooting effect of each of the shooting modes. In this way, the user does not need to check the plurality of shooting modes one by one.

Figure 3E:
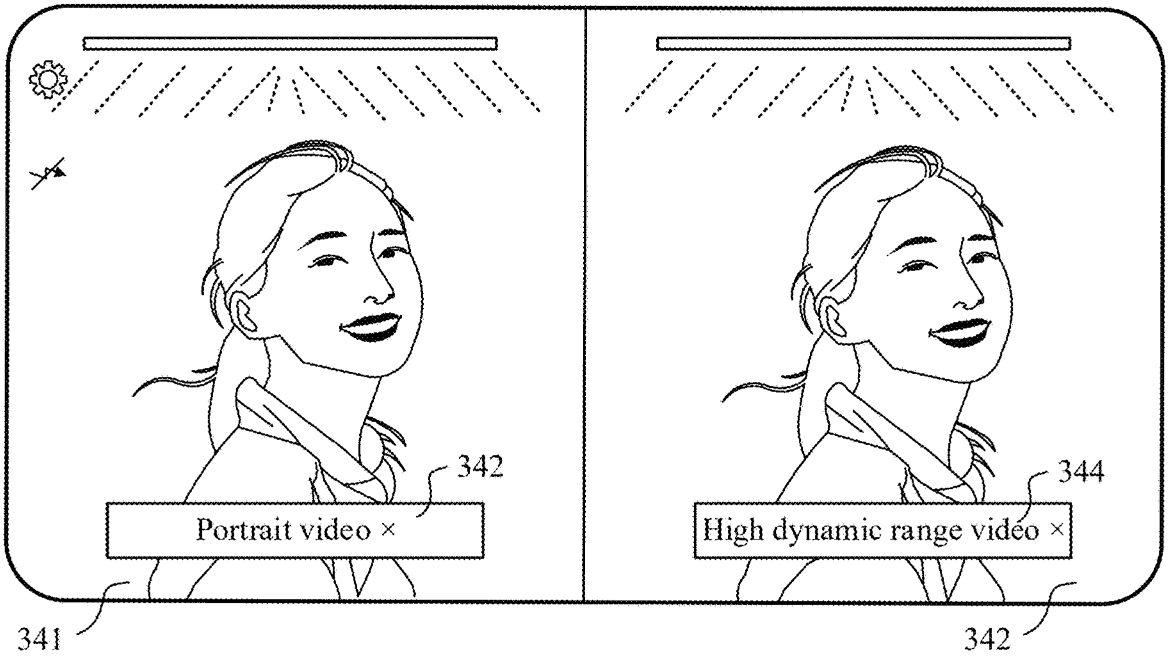
Figure 3F:
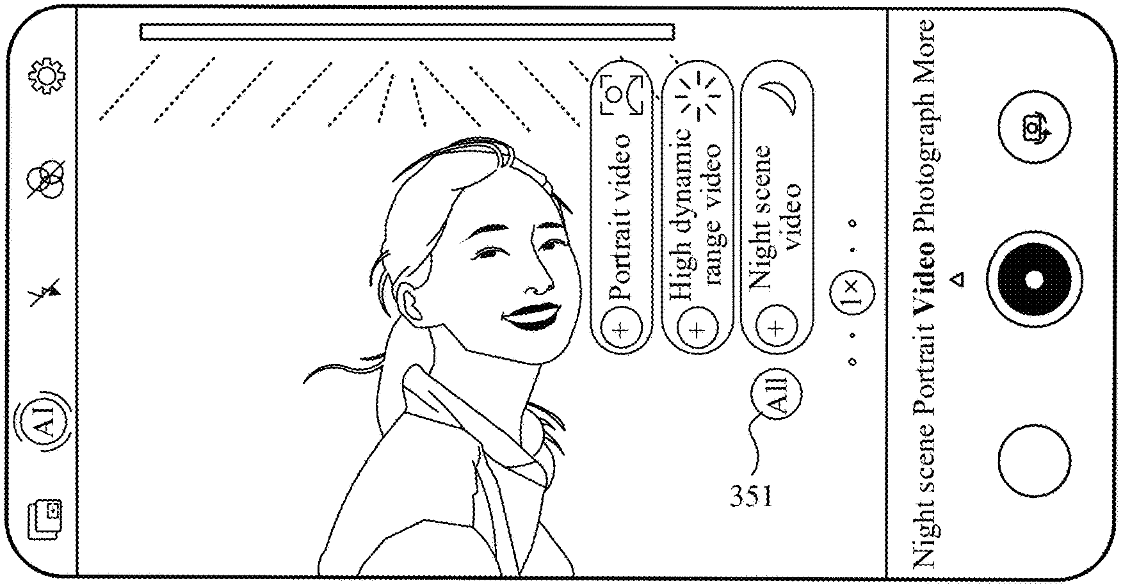
Figure 3G:
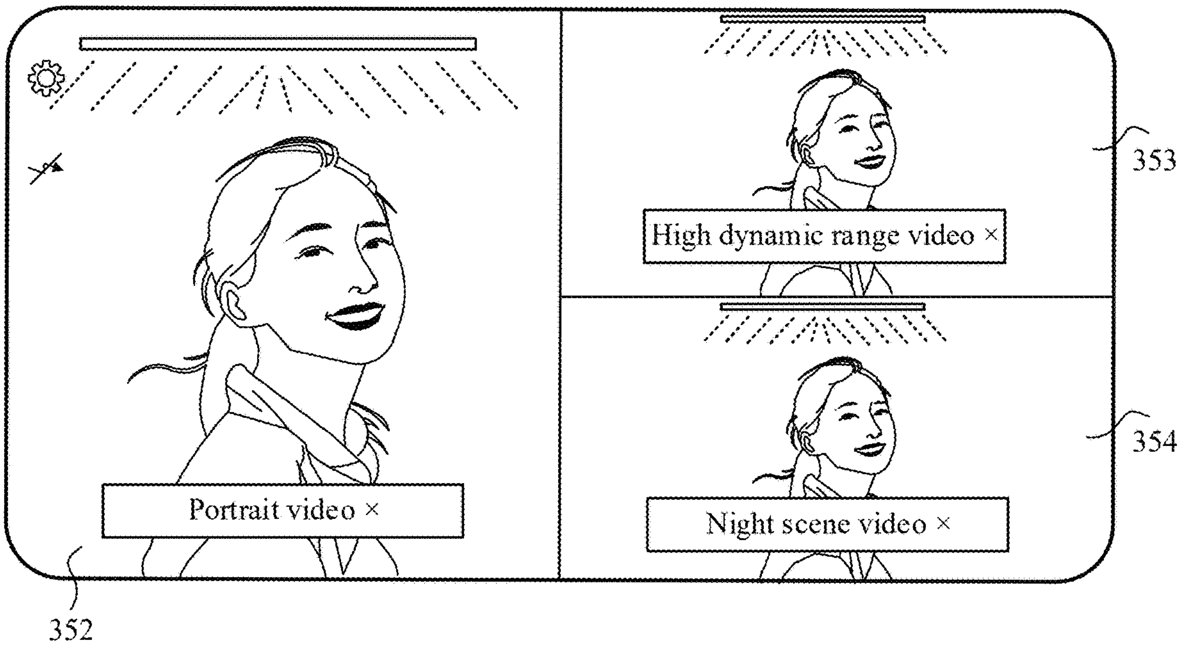

Referring to FIG. 3F, after the high dynamic range mode, the portrait mode, and the night scene mode are matched and recommended, the electronic device 100 may display a control 351. The control 351 may be configured to one-button preview the shooting effects of the recommended shooting modes. For example, after detecting a user operation performed on the control 351, the electronic device 100 may display a user interface shown in FIG. 3G. The user interface may include a window 352, a window 353, and a window 354. The window 352, the window 353, and the window 354 are configured to display shooting effects of the portrait mode, the high dynamic range mode, and the night scene mode respectively. Then, the user may tap on any window to select the shooting mode corresponding to the window. For example, after detecting a user operation performed on the window 352, the electronic device 100 may enable the portrait mode and display the user interface shown in FIG. 2A.

Figure 4:
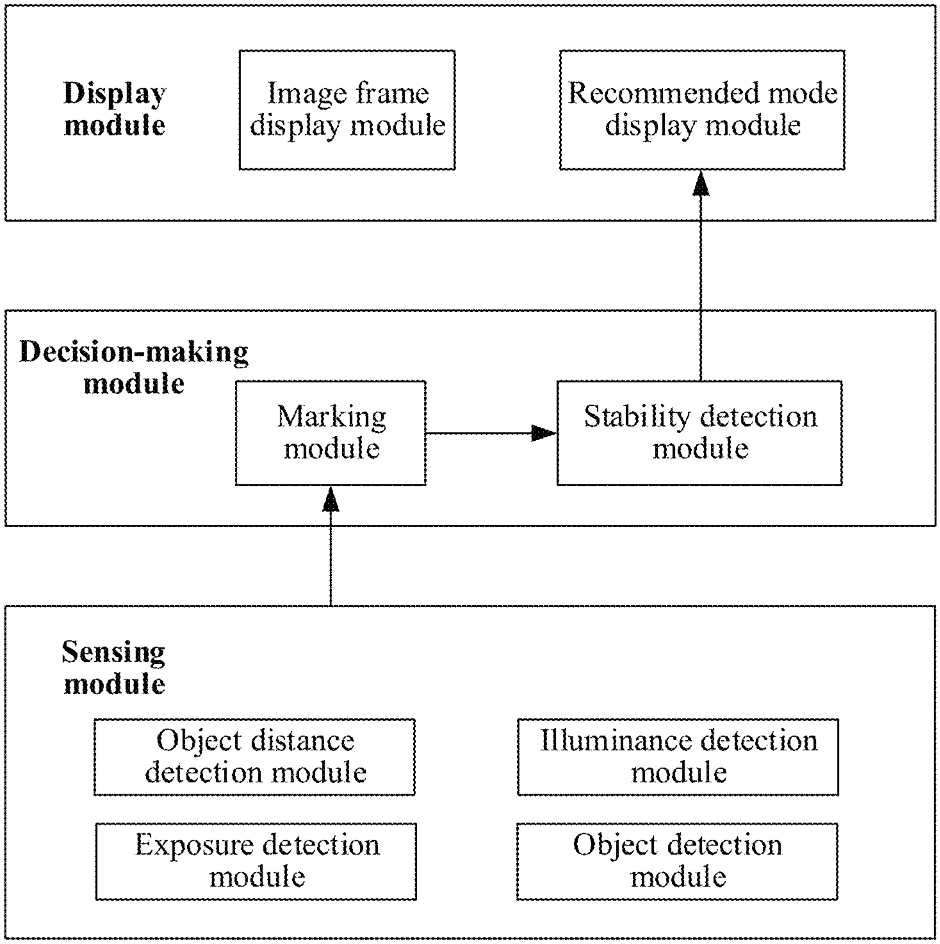
FIG. 4 is a schematic diagram of a structure of a camera application according to an embodiment of this application.

FIG. 4 is a schematic diagram of a structure of a camera application according to an embodiment of this application. As shown in FIG. 4, the camera application may include a sensing module, a decision-making module, and a display module.

The sensing module may be configured to obtain feature information of an image frame reported by the camera. The feature information includes, but is not limited to, an object distance, illuminance, a zoom ratio, an object, and the like. The sensing module may include an object distance detection module, an illuminance detection module, an exposure detection module, and an object detection module. The object distance detection module may be configured to determine an object distance of the image frame, that is, a distance between a focused object in the image and a lens. The illuminance detection module may be configured to determine illuminance of the image frame. The exposure detection module may be configured to determine an exposure proportion of the image frame, and determine whether overexposure exists in the image frame. The object detection module may be configured to recognize image content in the image frame, and determine whether the image includes a specific object such as a person, a cat, or a dog. The object detection module may output a type, a quantity, and an area ratio of an object included in the image. The area ratio of the object is a ratio of an imaging area of the object or a part of an area in the image to a total area of the image. For example, when a person is recognized, the object detection module may output a human face area ratio, that is, a ratio of an area occupied by a human face region to the total area of the image.

The decision-making module may determine, based on feature information of an image stream, a preferred shooting mode in the current scene, which is denoted as a recommended mode. An image frame sequence formed by consecutive image frames is an image stream. The decision-making module may include a marking module and a stability detection module.

The marking module may mark the image frame based on the feature information output by the sensing module. The six described shooting modes (the macro mode, the night scene mode, the portrait mode, the high dynamic range mode, the protagonist mode, and the multi-lens mode) in the foregoing user interfaces are used as an example. The marking module may mark a shooting mode that an image frame matches. For example, when feature information of an image frame is consistent with feature information of an image in a close-shooting scene, the marking module may mark that the frame of image matches the macro mode. For example, the marking module may attach a macro tag to the frame of image. For another example, when the feature information of the image frame is consistent with feature information of an image in a night scene, the marking module may attach a night scene tag to the frame image, or the like. This is not listed herein. A policy for the marking module to determine, based on feature information of an image, a shooting mode matching the feature information of the image is described in detail in subsequent embodiments. This is not described in detail herein.

The stability detection module may monitor changes in tags in the image stream, determine duration of each type of tag, and then determine stability of each type of tag. A shooting mode corresponding to a tag that is determined as stable is a preferred shooting mode (namely, a recommended mode) in the current scene.

The display module may include an image frame display module and a recommended mode display module. The image frame display module may be configured to display an image frame reported by the camera. The recommended mode display module may be configured to determine and display a user interface element corresponding to the recommended mode, such as the control 132 shown in FIG. 1E or the control 133 shown in FIG. 1H.

Figure 5:
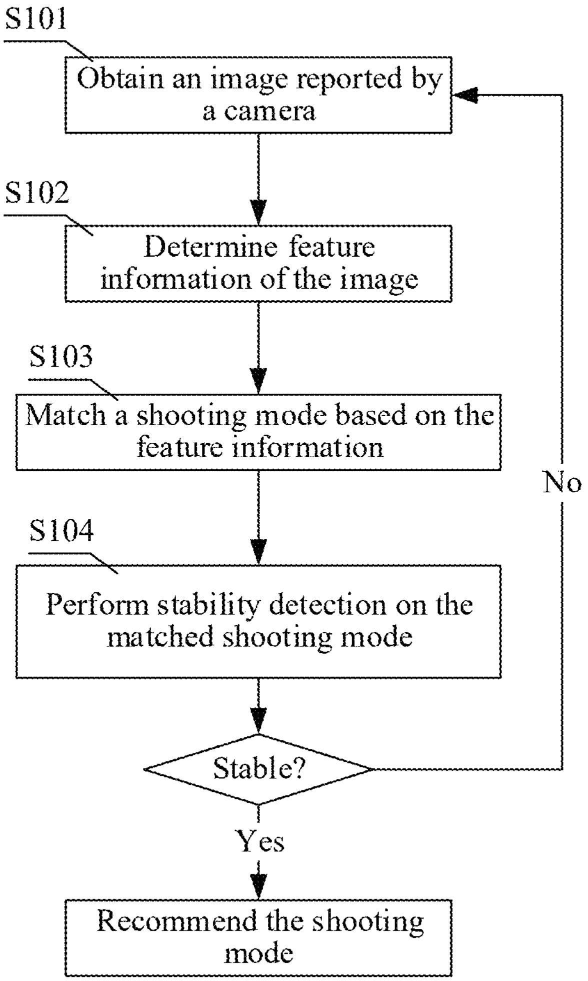
FIG. 5 is a flowchart of a shooting mode recommendation method according to an embodiment of this application.

FIG. 5 is a flowchart of a shooting mode recommendation method according to an embodiment of this application.

S101: Obtain an image reported by a camera.

A camera of the electronic device 100 may generate an image in real time based on light in a viewing range, and send the image to an upper application that invokes the camera, for example, a camera application. A frame rate of 30 fps is used as an example. The camera may report one frame of image to the camera application every 33.3 milliseconds (ms), that is, the camera application may receive one frame of image every 33.3 ms. An image frame sequence reported by the camera to the camera application may be referred to as an image stream.

S102: Determine feature information of the image.

After receiving one frame of image, the camera application may determine feature information of the image. With reference to the description of FIG. 4, specifically, the sensing module in the camera application can determine the feature information of the image.

The object distance detection module can determine an object distance of the image. A smaller distance between a shooting subject in the image and a lens of the camera indicates a smaller object distance; and a larger distance between the shooting subject in the image and the lens of the camera indicates a larger object distance. The illuminance detection module can determine illuminance of the image. A brighter shooting environment indicates lower illuminance of the image; and a darker shooting environment indicates higher illuminance of the image. The exposure detection module can determine an exposure proportion of the image. The object detection module can recognize whether the image includes a specific object such as a person, a cat, or a dog, and output a type, a quantity, an area ratio, and/or the like of the object.

A size of the image (also referred to as an original image) reported by the camera is generally large, for example, 1920*1080 pixels (p). When the detection is performed, a calculation cost corresponding to a large-sized image increases by a multiple level, so that a calculation load and power consumption of the electronic device 100 increase, and the electronic device may even be stuck. Therefore, optionally, after receiving the original image reported by the camera, the camera application may down-sample the original image to obtain a small-sized image, which is denoted as a processed image. A size of the processed image is, for example, 640*480 p. Then, the sensing module may detect the processed image, to obtain the feature information of the image. S103: Match a shooting mode based on the feature information.

The electronic device 100 may store matching conditions of different shooting modes. When the feature information of the image satisfies a matching condition of a specific mode, the marking module may determine that the image matches the specific mode. The marking module may attach a tag corresponding to the specific mode to the image, to mark an association relationship between the image and the shooting mode.

The six shooting modes (the macro mode, the night scene mode, the portrait mode, the high dynamic range mode, the protagonist mode, and the multi-lens mode) described in the foregoing embodiments are still used as an example. For example, Table 1 shows matching conditions of the shooting modes stored in the electronic device 100.

TABLE 1

| Tag | Shooting mode | Matching condition | Applicable scene |
|---|---|---|---|
| Macro | Macro | Object distance ≤ D1; illuminance ≥ L1; and zoom ratio = 1×. | Close-up shooting |
| Night scene | Night scene | Illuminance ≤ L2; and zoom ratio is within 1× to 2×. | Shooting a night scene |
| Portrait | Portrait | Maximum proportion of a human face area ≥ P1; illuminance ≥ L3; and zoom ratio is within 1× to 2×. | Shooting a portrait |
| High dynamic range | High dynamic range | Exposure proportion ≥ M1; and zoom ratio is within 1× to 6×. | High-exposure shooting |
| Protagonist | Protagonist | Number of human faces ≥ 2; P2 < maximum proportion of a human face area < P1; illuminance ≥ L4; and zoom ratio is within 0.56× to 2×. | Shooting a plurality of people |
| Multi-lens | Multi-lens | Recognize a preset object such as a cat or a dog; and zoom ratio is within 1× to 6×. | Shooting a specific object |

An object distance threshold D1, illuminance thresholds L1, L2, L3, and L4, and proportion thresholds P1 and P2 are preset, and specific values thereof are not limited in embodiments of this application. It may be understood that the developer may set the specific values based on experience.

For example, D1=12 cm; L1=100 lux, L2=50 lux, L3=100 lux, and L4=150 lux; M1=0.3; and P1=0.15, and P2=0.07. The illuminance may further be represented by using lux-index. A value of Luxindex is inversely proportional to a brightness of ambient light. A larger Luxindex indicates a smaller brightness of the ambient light. The portrait mode and the protagonist mode are mutually exclusive. One frame of image does not match both the portrait mode and the protagonist mode. In other words, one frame of image does not carry both the portrait tag and the protagonist tag.

For the multi-lens mode, the electronic device 100 may further set another matching condition. For example, the electronic device 100 determines, through a sound signal collected by the camera, whether the user speaks speech content such as "together" or "come on". After detecting the speech content, the electronic device 100 may match the multi-lens mode, and enable a plurality of cameras to generate a plurality of videos.

S104: Perform stability detection on the matched shooting mode, and when the matched shooting mode is stable, recommend the shooting mode.

After determining a tag of a currently reported image frame, the stability detection module may obtain tags of N−1 frames of images before the frame. When N consecutive frames of images all carry a tag, the stability detection module may determine that the shooting mode corresponding to the tag is stable. Further, the stability detection module may determine to recommend the shooting mode. Otherwise, the stability detection module does not recommend the shooting mode. Time corresponding to the N frames of images is the entry period described above. For example, in a scene with a frame rate of 30 fps, N=15 corresponds to 0.5 s.

After receiving a next frame of image, the camera application may repeat the steps shown in S101 to S104. Only when a shooting mode passes stability detection, the camera application displays a control corresponding to the shooting mode on the screen, and recommends the shooting mode to the user.

For example, any frame of image reported by the camera, for example, an $i^{th}$ frame of image, is processed by the sensing module, and the camera application may determine feature information of the frame of image. For example, the feature information of the $i^{th}$ frame of image output by the the sensing module includes: an object distance Di=50 cm, illuminance Li=160 lux, a zoom ratio Xi=1×, an exposure proportion Bi=0.5, a number of persons=1, and a proportion of a human face area Pi=0.16, where the zoom ratio Xi is reported with frames. The camera application can directly obtain the feature information from the image reported by the camera without other calculation.

Then, the marking module of the camera application may mark the $i^{th}$ frame of image based on the matching relationships shown in Table 1. The marking module may independently match the feature information of the $i^{th}$ frame of image with each shooting mode. Therefore, the $i^{th}$ frame image may carry a plurality of tags at the same time. For example, the marking module may determine that Di (50 cm)>D1 (12 cm), Li (40 lux)≤L2 (50 lux)≤L1 (100 lux), L3 (100 lux)≤L4 (150 lux), Bi (0.5)>M1 (0.3), and Pi (0.16)>P1 (0.15)>P2 (0.07). The marking module may determine that the $i^{th}$ frame of image matches the night scene mode, the portrait mode, and the high dynamic range mode. In this case, the $i^{th}$ frame of image may carry the night scene tag, the portrait tag, and the high dynamic range tag.

Then, the stability detection module can determine stability of one or more tags carried in the image stream until the $i^{th}$ frame of image. If the N consecutive frames of images all carry the one or more tags, the stability detection module may determine that the one or more tags are stable. For example, if it is determined that both the $i^{th}$ frame of image and the N−1 frames of images before the $i^{th}$ frame of image carry the night scene tag and the portrait tag, the stability detection module may determine that the night scene mode and the portrait mode are stable. If it is determined that one or more frames in the $i^{th}$ frame of image and the N−1 frames of images before the $i^{th}$ frame of image do not carry the high dynamic range tag, the stability detection module may determine that the high dynamic range mode is unstable.

In this case, the decision-making module may determine to recommend the night scene mode and/or the portrait mode to the user. Referring to the introduction of FIG. 3A, when a plurality of shooting modes are matched, the electronic device 100 may select, based on priorities of the shooting modes, a shooting mode with a highest priority to recommend the shooting mode to the user. In this case, the electronic device 100 may further determine the night scene mode from the night scene mode and the portrait mode (the night scene mode has a higher priority than the portrait mode), and recommend the night scene mode to the user. Referring to the introduction of FIG. 3B, when a plurality of shooting modes are matched, the electronic device 100 may recommend all the matched shooting modes to the user. In this case, the electronic device 100 may recommend both the night scene mode and the portrait mode to the user. The recommended mode display module may display controls corresponding to the night scene mode and the portrait mode. The user may tap on a control to enter a corresponding shooting mode for shooting.

Figure 6:
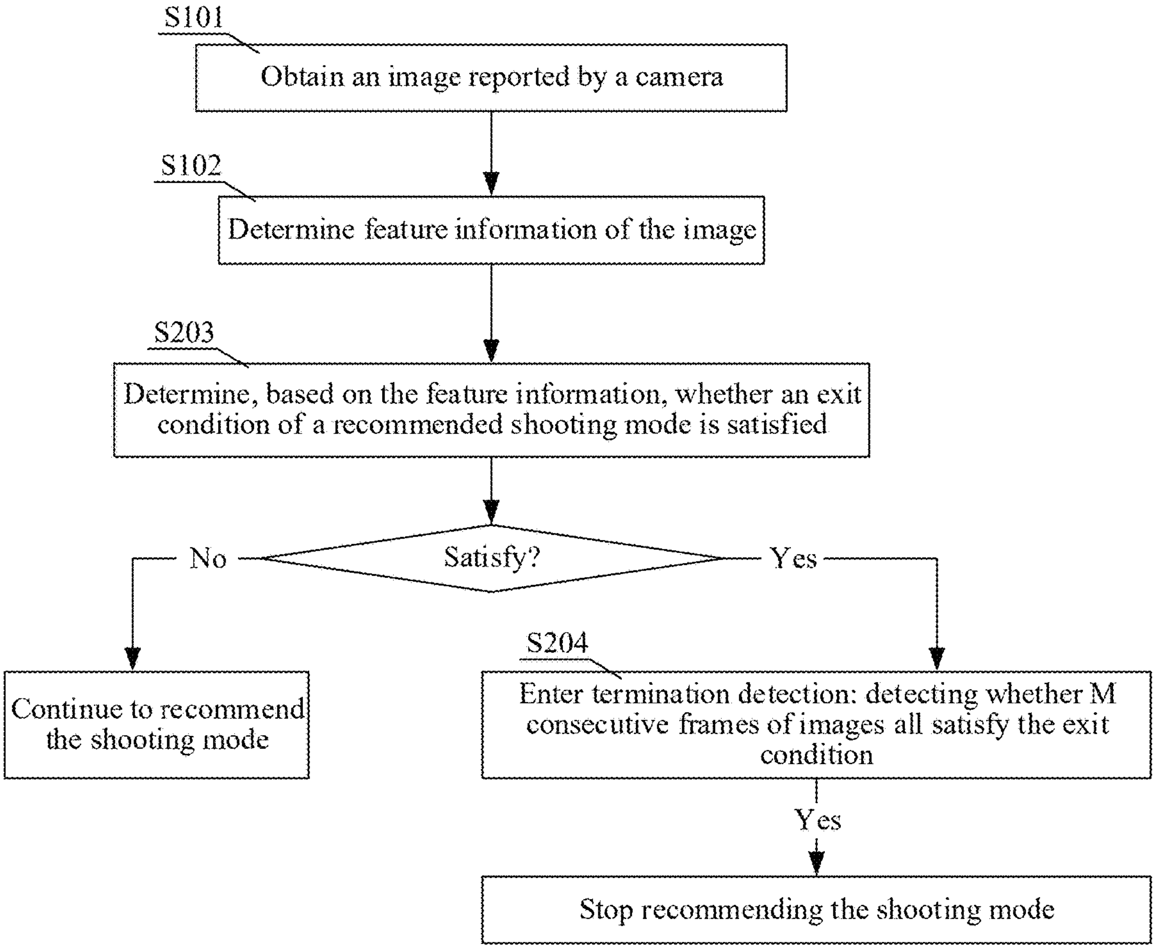
FIG. 6 is a flowchart of a shooting mode recommendation method according to an embodiment of this application.

FIG. 6 is a flowchart of a shooting mode recommendation method according to an embodiment of this application.

After determining the one or more recommended modes, the electronic device 100 may detect, according to the method shown in FIG. 6, whether the current scene still matches the recommended shooting mode. If the current scene matches the recommended shooting mode, the electronic device 100 continues to recommend the shooting mode to the user. If the current scene does not match the recommended shooting mode, the electronic device 100 stops recommending the shooting mode to the user.

The methods shown in FIG. 5 and FIG. 6 are concurrent. While detecting whether the current scene still matches the recommended shooting mode, the electronic device 100 also continues to determine the shooting mode matching the current scene based on the feature information of the image, perform stability detection, and then recommend the shooting mode to the user.

S101 and S102 in FIG. 6 are the same as S101 and S102 in FIG. 5, and can be reused. Details are not described herein again.

S203: Determine, based on the feature information, whether an exit condition of a recommended shooting mode is satisfied.

The exit condition is a condition for stopping recommending a type of shooting mode. The marking module of the camera application detects whether a current image matches an exit condition of a shooting mode when and only when the shooting mode is set as a recommended mode.

In an optional implementation, the exit condition is the same as a matching condition for recommending a specific shooting mode. When the feature information of the image does not satisfy the matching condition, the exit condition is satisfied.

For example, referring to the description in Table 1, the matching condition for the macro mode is "Object distance≤12 cm; illuminance≥100 lux; and zoom ratio=1×". The matching condition may be used as an exit condition for determining to stop recommending the macro mode. For example, when feature information of a specific image reported subsequently does not satisfy "Object distance≤12 cm; illuminance≥100 lux; and zoom ratio=1×", that is, "object distance>12 cm, or illuminance<100 lux, or zoom ratio≠1×", the marking module may determine that the feature information of the image satisfies the exit condition. Therefore, the marking module may determine that the image does not match the macro mode, and then the stability detection module may determine to stop recommending the macro mode.

In another optional implementation, an exit condition for stopping recommending a type of shooting mode is different from a matching condition for recommending the shooting mode.

Similarly, the macro mode is used as an example. An exit condition of the macro mode may be "object distance>17 cm, or illuminance<100 lux, or zoom ratio≠1×". After the macro mode is recommended to the user, the marking module may determine, based on the exit condition, whether a subsequent image matches the macro mode. When feature information of an image reported subsequently satisfies "object distance>17 cm, or illuminance<100 lux, or zoom ratio=1×", the marking module may determine that the image does not match the macro mode. The decision-making module stops recommending the macro mode. For example, when an object distance in a subsequent frame of image is 18 cm, the marking module may determine that the image does not match the macro mode.

Generally, the exit condition may be looser than the matching condition. For example, after the macro mode is recommended, the stability detection module determines that the macro mode is not matched only when the object distance exceeds 17 cm, rather than 12 cm before the recommendation. In this way, complex situations in the shooting process of the user are taken into consideration, thereby reducing restrictions on the user, and further improving user experience.

Specifically, Table 2 exemplarily shows exit conditions of the six modes. The exit condition and the matching condition of a part of the modes are opposite (when the matching condition is not satisfied, the exit condition is definitely satisfied), and the exit condition and the matching condition of a part of the modes are only mutually exclusive and are not opposite (when the matching condition is not satisfied, the exit condition is not necessarily satisfied).

TABLE 2

| Tag | Shooting mode | Exit condition | Applicable scene |
|---|---|---|---|
| Macro | Macro | Object distance > 17 cm; illuminance < 100 lux; and zoom ratio ≠ 1×. | Close-up shooting |
| Night scene | Night scene | Illuminance > 50 lux; and zoom ratio is outside 1× to 2×. | Shooting a night scene |
| Portrait | Portrait | Maximum proportion of a human face area ≤ 0.1; illuminance < 100 lux; and zoom ratio is outside 1× to 2×. | Shooting a portrait |
| High dynamic range | High dynamic range | Exposure proportion < M1; and zoom ratio is outside 1× to 6×. | High-exposure shooting |
| Protagonist | Protagonist | Number of human faces ≥ 2; maximum proportion of a human face area ≤ 0.05 or >0.15; illuminance < 150 lux; and zoom ratio is outside 0.56× to 2×. | Shooting a plurality of people |
| Multi-lens | Multi-lens | A preset object such as a cat or a dog cannot be recognized; and zoom ratio is outside 1× to 6×. | Shooting a specific object |

Different parameters have an "or" relationship in the exit condition. If one parameter in the exit condition is satisfied, the exit condition is satisfied, and the electronic device 100 can determine to stop displaying a corresponding tag. When the zoom ratio of the electronic device 100 satisfies the exit conditions shown in Table 2, the electronic device 100 can immediately stop displaying a corresponding recommendation tag; and when parameters such as the object distance, the illuminance, and the exposure proportion satisfy the exit conditions shown in Table 2, the electronic device 100 may stop displaying the corresponding recommendation tag after the stability detection is passed, instead of immediately stopping displaying the corresponding recommendation tag.

S204: When it is detected that an exit condition for a specific recommended shooting mode is satisfied, enter termination detection, that is, stability detection during exit: detecting whether M consecutive frames of images all satisfy the exit condition of the shooting mode. After the termination detection is passed, recommendation of the shooting mode is stopped.

With reference to the example in FIG. 5 in which a single shooting mode is recommended based on the priorities, the electronic device 100 may recommend the night scene mode to the user from the $i^{th}$ frame of image. The marking module may determine a shooting mode matching a $k^{th}$ frame of image as: the high dynamic range mode. The $k^{th}$ frame of image is an image reported by the camera to the camera application after the $i^{th}$ frame of image, the $i^{th}$ frame of image to a (k−1)th frame of image each carry the night scene tag, and the $k^{th}$ frame of image does not carry the night scene tag (that is, the $k^{th}$ frame of image does not match the night scene mode).

In this case, the stability detection module may determine that the shooting mode (namely, the high dynamic range mode) that the $k^{th}$ frame matches is inconsistent with a currently recommended shooting mode (that is, the night scene mode). Therefore, the stability detection module may enter the termination detection.

After entering the termination detection, first, the stability detection module may set a timer. Timing duration of the timer corresponds to the exit period described above. Before timing of the timer ends, the stability detection module may monitor a tag of each frame of image reported by the camera, to determine whether none of the images in this period matches the currently recommended shooting mode. When it is determined that none of the images matches the currently recommended shooting mode, the decision-making module stops recommending the shooting mode.

An example is used in which the exit period=1 s (30 frames of images). The stability detection module may set a timer with timing duration of 1 s and start timing. In 1 s, the camera application may receive 30 frames of images (the $k^{th}$ to $(k+29)^{th}$ frames of images) reported by the camera. If none of the 30 frames of images carries the night scene tag, after the $(k+29)^{th}$ frame of image, that is, when the timing ends, the stability detection module may determine to stop recommending the night scene mode. Correspondingly, the recommended mode display module stops displaying a control corresponding to the night scene mode. If it is detected that the night scene tag is carried in any one of the frames of images before the 30th frame of image, the termination detection is exited.

In some embodiments, when the image no longer matches the currently recommended shooting mode due to a change in the zoom ratio, the decision-making module may alternatively not perform the termination detection, but directly determine to stop recommending the shooting mode. For example, the zoom ratio of the $k^{th}$ frame image is 5×, which exceeds the "zoom ratio is within 1× to 2×" required for the night scene mode. In this case, the $k^{th}$ frame of image no longer matches the night scene mode. When the foregoing mismatch is detected, the decision-making module may directly determine to stop recommending the night scene mode without waiting for 1 S.

FIG. 7A to FIG. 7D are schematic diagrams of switching between recommended mode in a scene in which a single shooting mode is recommended.

Figure 7A:
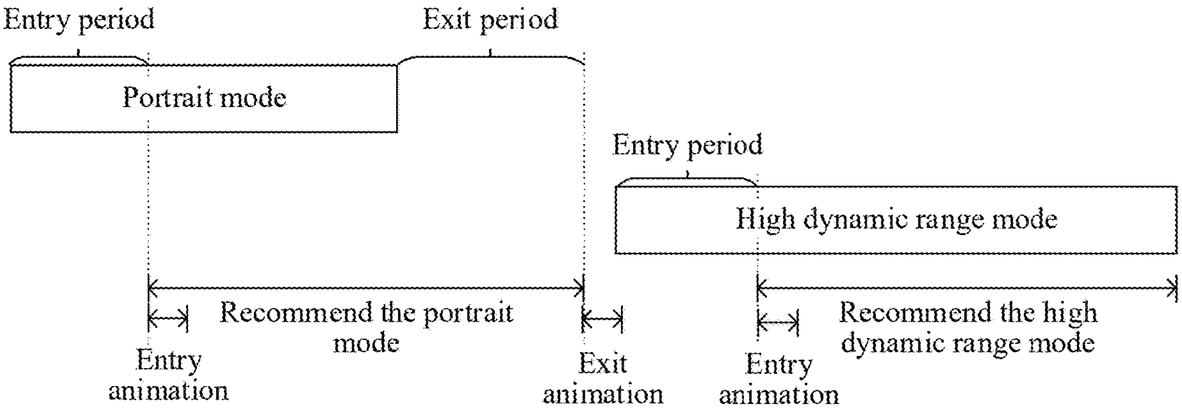
FIG. 7A to FIG. 7D are schematic diagrams of switching between recommended modes in a scene in which a single shooting mode is recommended.

The portrait mode and the high dynamic range mode are used as an example. As shown in FIG. 7A, after stability detection of the portrait mode is completed, that is, after an entry period of the portrait mode ends, the camera application may determine that the portrait mode is recommended, and display, in the user interface, a control corresponding to the portrait mode, for example, the control 132 in FIG. 1E. After the exit period of the portrait mode ends, the camera application stops recommending the portrait mode. Optionally, the camera application may display an exit animation of the control corresponding to the portrait mode.

After the exit period of the portrait mode ends, the camera application may match to the high dynamic range mode, and stability detection of the high dynamic range mode is completed. Then, the camera application may determine to recommending the high dynamic range mode, and display a control corresponding to the high dynamic range mode, for example, the control 133 in FIG. 1H.

Figure 7B:
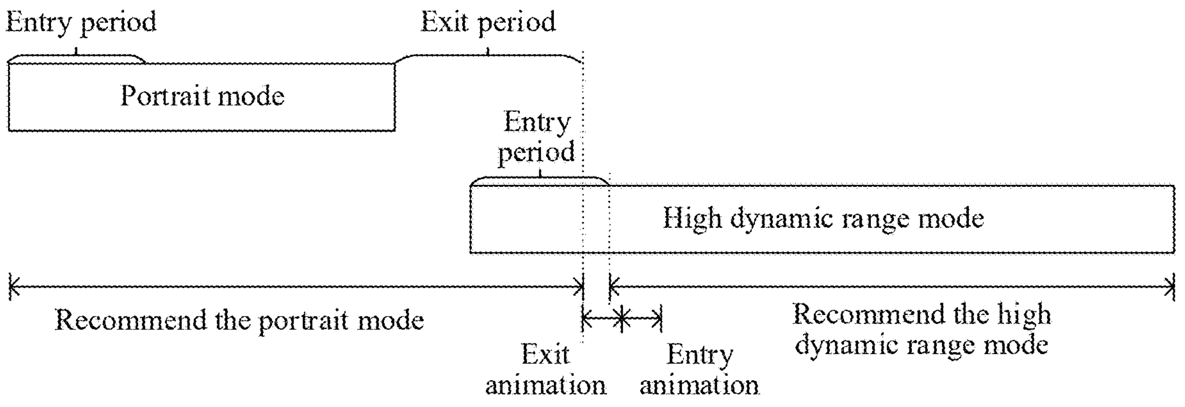

In some shooting scenes, as shown in FIG. 7B, the camera application may stably match to the high dynamic range mode before the control corresponding to the portrait mode completely exits. In this case, after the control corresponding to the portrait mode completely exits, the camera application may display an entry animation of the control of the high dynamic range mode.

Figure 7C:
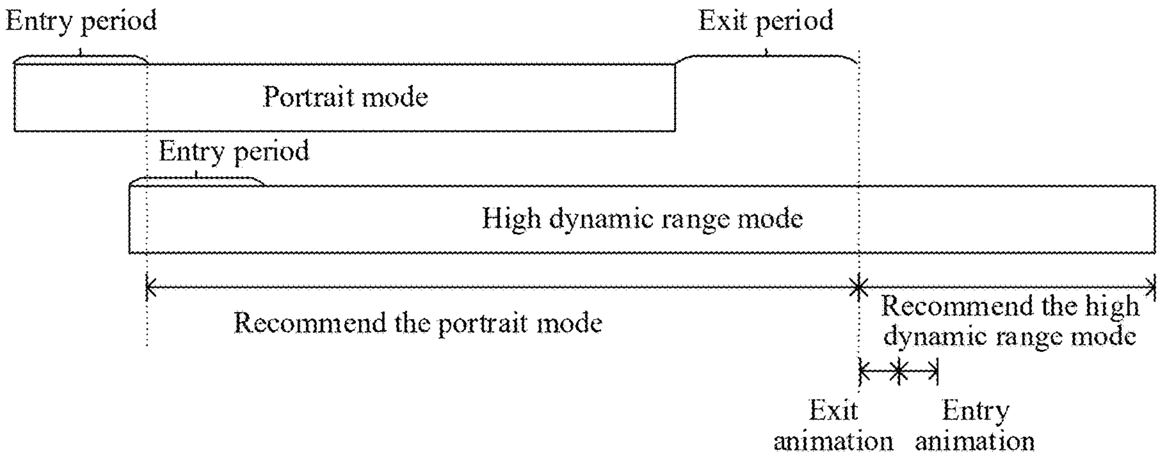

In some other shooting scenes, the camera application may match the portrait mode and the high dynamic range mode in sequence, and complete the stability detection of the portrait mode and the high dynamic range mode in sequence. As shown in FIG. 7C, after the entry period of the portrait mode ends, and before the entry period of the high dynamic range mode ends, the recommended mode determined by the camera application is the portrait mode. After the entry period of the high dynamic range mode ends, based on the priorities of the shooting modes, the recommended mode determined by the camera application is still the portrait mode. After the exit period of the portrait mode ends, the camera application may determine that the high dynamic range mode is the recommended mode. The camera application may display the exit animation of the control corresponding to the portrait mode, and then display the entry animation of the control corresponding to the high dynamic range mode, to update the recommended mode.

Figure 7D:
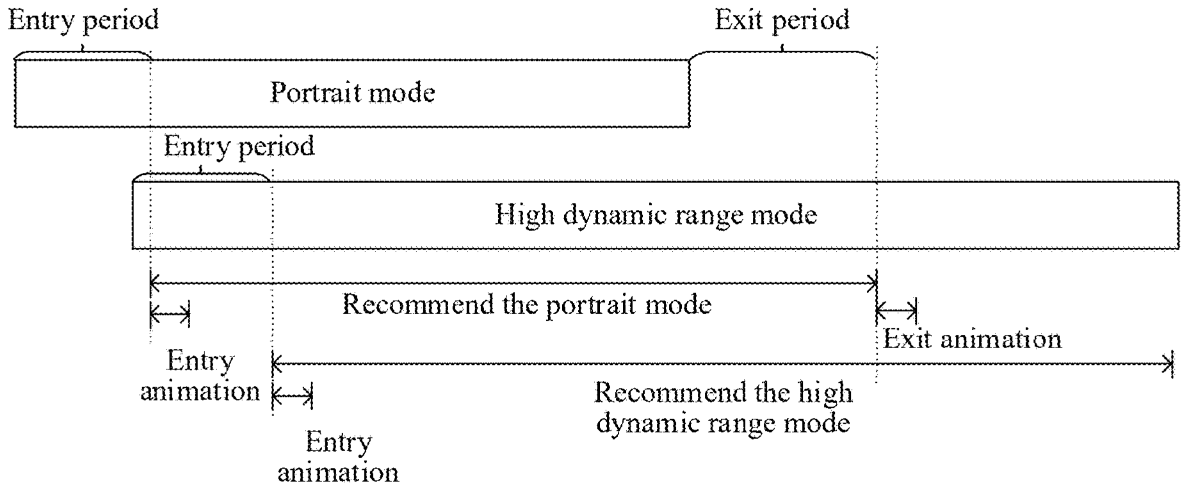

In a scene in which a plurality of recommended modes are displayed simultaneously (referring to FIG. 3B), as shown in FIG. 7D, after the entry period of the high dynamic range mode ends, the camera application may then display the entry animation of the control corresponding to the high dynamic range mode, to recommend the high dynamic range mode to the user. Therefore, the user can view a recommendation control corresponding to the portrait mode and a control corresponding to a video recording mode at the same time.

In this embodiment of this application, the user interface shown in FIG. 1B may be referred to as a first preview interface, and the preview window 123 in FIG. 1B may be referred to as a first preview window.

The entry period introduced in FIG. 1C may be referred to as a first time period. The portrait mode recognized in the first time period and matching current portrait shooting may be referred to as a first shooting mode. Correspondingly, the control 132 displayed in FIG. 1D or FIG. 1E may be referred to as a first control. The user operation of tapping on the control 132 may be referred to as a first operation.

The user interface shown in FIG. 2A may be referred to as a second preview interface, and the preview window 211 in FIG. 2A may be referred to as a second preview window. An image after portrait processing (including background blur and/or beauty) displayed in the preview window 211 may be referred to as a first image.

The entry period of the shooting process shown in FIG. 1E to FIG. 1G may be referred to as a second time period. The recognized high dynamic range mode matching current overexposure shooting in the second time period may be referred to as a second shooting mode. Correspondingly, the control 133 displayed in FIG. 1G may be referred to as a second control. The user operation of tapping on the control 133 may be referred to as a second operation.

The user interface shown in FIG. 2H may be referred to as a third preview interface, and the preview window 231 in FIG. 2H may be referred to as a third preview window. An image after exposure compensation processing displayed in the preview window 231 may be referred to as a second image.

The user interface shown in FIG. 3E may be referred to as a fourth preview interface, the window 341 in FIG. 3E may be referred to as a fourth preview window, and the window 342 may be referred to as a fifth preview window.

Figure 8:
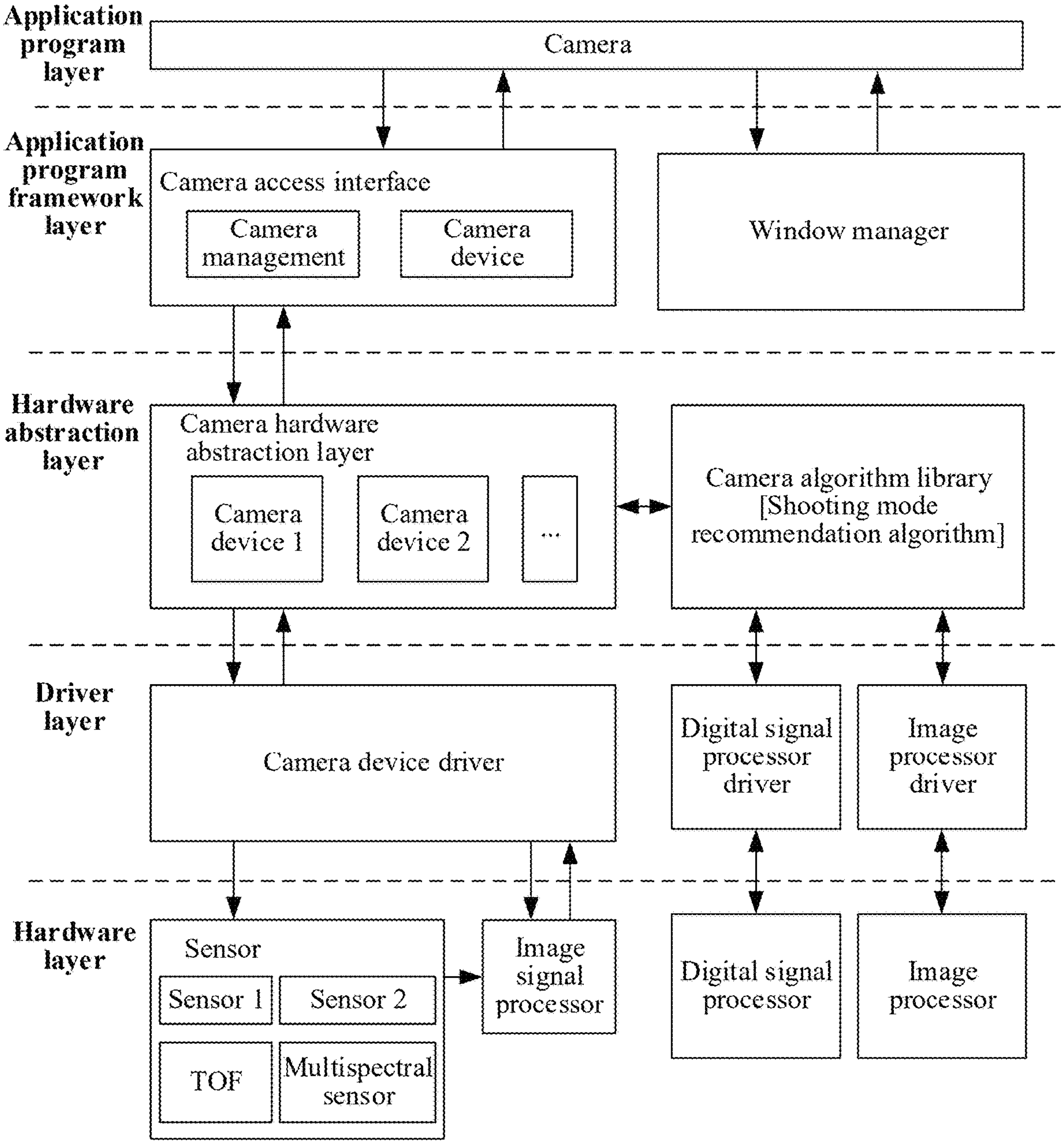
FIG. 8 is a schematic diagram of a system structure of an electronic device 100 according to an embodiment of this application.

FIG. 8 is a schematic diagram of a system structure of an electronic device 100 according to an embodiment of this application.

In a layered architecture, a system is divided into several layers, and each layer has a clear role and task. The layers communicate with each other through a software interface. In some embodiments, the system is divided into five layers, which are an application program layer, an application program framework layer, a hardware abstraction layer, a driver layer, and a hardware layer, respectively, from top to bottom.

The application program layer may include a series of application program packages. In this embodiment of this application, the application program package may include a camera.

The application program framework layer provides an application programming interface (application programming interface, API) and a programming framework for application programs at the application program layer. The application program framework layer includes some predefined functions. In this embodiment of this application, the application program framework layer may include a camera access interface. The camera access interface may include camera management and a camera device. The camera access interface is configured to provide an application programming interface and a programming framework for a camera application.

The hardware abstraction layer is an interface layer between the application program framework layer and the driver layer, and provides a virtual hardware platform for an operating system. In this embodiment of this application, the hardware abstraction layer may include a camera hardware abstraction layer and a camera algorithm library.

The camera hardware abstraction layer may provide virtual hardware of the camera device 1 and the camera device 2, or more camera devices. The camera device 1, the camera device 2, and the more camera devices correspond to one or more cameras mounted on the electronic device 100. The electronic device 100 may invoke each camera through camera devices such as the camera device 1 and the camera device 2. The camera algorithm library may include running code and data that implement the shooting mode recommendation method provided in embodiments of this application.

The driver layer is a layer between hardware and software. The driver layer includes drivers of various hardware. The driver layer may include a camera device driver, a digital signal processor driver, an image processor driver, and the like. The camera device driver is configured to drive a sensor of the camera to collect images and drive an image signal processor to preprocess the images. The digital signal processor driver is configured to drive the digital signal processor to process an image. The image processor driver is configured to drive a graphics processing unit to process an image.

The following specifically describes the method in embodiments of this application with reference to the foregoing hardware structure and the system structure.

1. An electronic device 100 enables a camera, and obtain an image reported by the camera.

In response to an operation (for example, a tap operation) of a user performed on a camera application icon, the camera application invokes a camera access interface at an application framework layer to enable a camera application, and then invokes a camera device 1 (by default, generally a main camera) at a camera hardware abstraction layer to send an instruction of enabling the camera application. The camera hardware abstraction layer sends the instruction to a camera device driver at a driver layer. The camera device driver may enable a sensor (for example, a sensor 1) corresponding to the camera device 1 to collect an image light signal through the sensor 1. The image light signal is transmitted to an image signal processor for preprocessing, to obtain an image, and then the image is transmitted to a camera hardware abstraction layer through the camera device driver. Consecutively generated images form an image stream.

2. The electronic device 100 determines a current shooting scene based on the image, and determines a shooting mode matching the shooting scene.

The camera hardware abstraction layer may directly transmit the image back to the camera application for display.

In addition, the camera hardware abstraction layer may send the image to a camera algorithm library. Based on support of a digital signal processor and an image processor, the camera algorithm library can extract feature information of the image. The camera algorithm library may determine an object distance of the image through a preset object distance detection algorithm; determine illuminance of the image through a preset illuminance detection algorithm; determine an exposure proportion of the image through a preset exposure detection algorithm; and recognize whether the image includes a specific object such as a human, a cat, or a dog, a number of objects, an area ratio, and the like through a preset human face detection algorithm and animal recognition algorithm.

Then, the camera algorithm library may determine the current shooting scene based on the feature information of the image, and determine the shooting mode matching the shooting scene. The camera algorithm library may set the matched shooting mode as a recommended mode. The camera algorithm library may transmit information of the recommended mode back to the camera application at an application layer.

The camera algorithm library may further include image processing algorithms corresponding to various shooting modes. After one or more shooting modes are selected, the camera algorithm library may invoke a corresponding image processing algorithm to process the image reported by the camera, and then upload a processed image back to the application layer for display.

3. The electronic device 100 updates content displayed in the screen, and recommends the shooting mode matching the current shooting scene to the user.

A specified region (for example, a preview window) of a camera application screen displays the image reported by the camera.

In addition, the camera application may manage each window in the user interface through a window manager, and update content displayed in the window, for example, the display control 132, and a switching display control 133. In this way, the electronic device 100 may recommend the shooting mode matching the current shooting scene to the user in real time through the controls.

Figure 9:
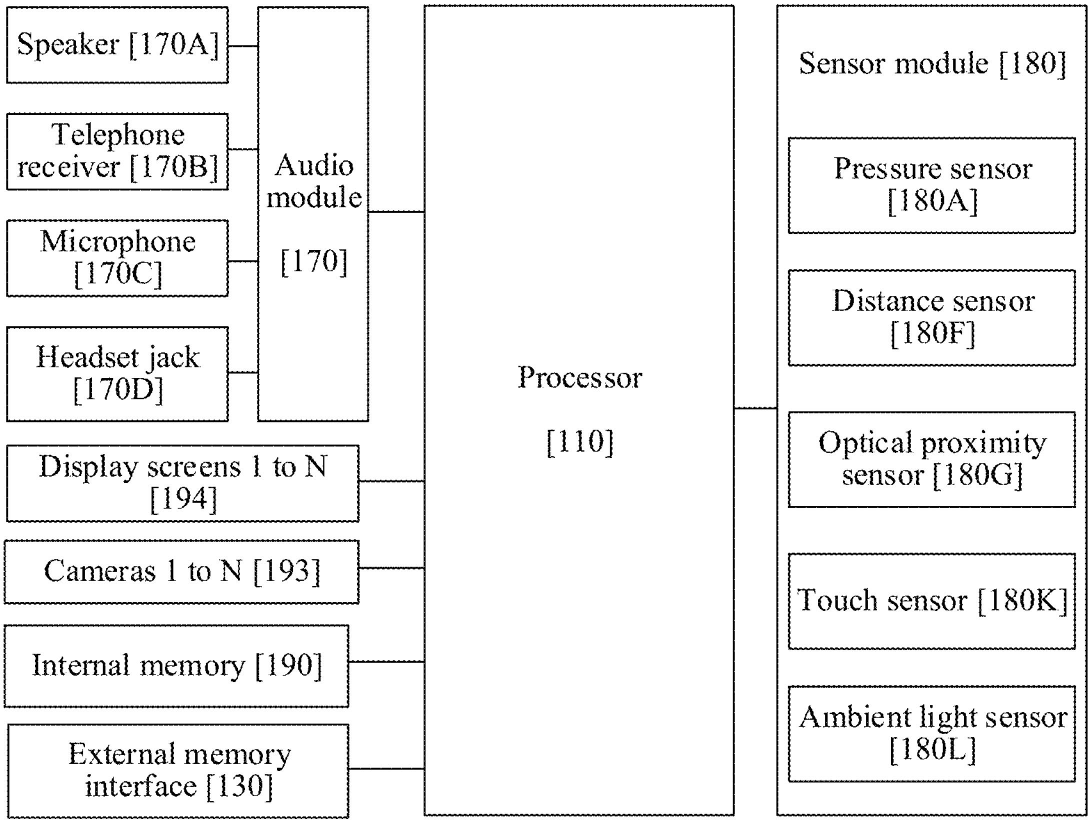
FIG. 9 is a schematic diagram of a hardware structure of an electronic device 100 according to an embodiment of this application.

FIG. 9 is a schematic diagram of a hardware structure of an electronic device 100 according to an embodiment of this application.

The electronic device 100 may include a processor 110, an external memory interface 130, an internal memory 190, an audio module 170, a speaker 170A, a telephone receiver 170B, a microphone 170C, a headset jack 170D, a sensor module 180, a camera 193, a display screen 194, and the like. The sensor module 180 may include a pressure sensor 180A, a distance sensor 180F, an optical proximity sensor 180G, a touch sensor 180K, an ambient light sensor 180L, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components in the figures may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. The controller may generate an operation control signal according to instruction operation code and a time-sequence signal, and control obtaining and executing of instructions.

A memory may further be disposed in the processor 110, configured to store instructions and data. In some embodiments, the memory in the processor 110 is a cache memory. The memory may store instructions or data recently used or cyclically used by the processor 110. If the processor 110 needs to use the instructions or the data again, the processor may directly invoke the instructions or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (serial clock line, SCL). In some embodiments, the processor 110 may include a plurality of sets of I2C buses. The processor 110 may be coupled to the touch sensor 180K, a charger, a flash light, the camera 193, and the like by using different I2C bus interfaces respectively. For example, the processor 110 may be coupled to the touch sensor 180K by using the I2C interface, so that the processor 110 communicates with the touch sensor 180K by using the I2C bus interface, to implement a touch function of the electronic device 100.

A MIPI may be configured to connect the processor 110 to a peripheral device such as the display screen 194 or the camera 193. The MIPI includes a camera serial interface (camera serial interface, CSI), a display serial interface (display serial interface, DSI), and the like. In some embodiments, the processor 110 communicates with the camera 193 by using the CSI interface, to implement a shooting function of the electronic device 100. The processor 110 communicates with the display screen 194 by using the DSI interface, to implement a display function of the electronic device 100.

A GPIO interface may be configured by using software. The GPIO interface may be configured as a control signal, or may be configured as a data signal. In some embodiments, the GPIO interface may be configured to connect the processor 110 to the camera 193, the display screen 194, the audio module 170, the sensor module 180, and the like. The GPIO interface may alternatively be configured as an I2C interface, an I2S interface, a UART interface, a MIPI, and the like.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The electronic device 100 implements the display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. A liquid crystal display (liquid crystal display, LCD) may be used as the display panel. The display panel may alternatively be an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device may include one or N display screens 194, where N is a positive integer greater than 1.

In this embodiment of this application, the electronic device 100 may display the user interfaces shown in FIG. 1A to FIG. 1H, FIG. 2A to FIG. 2H, and FIG. 3A to FIG. 3G through the GPU, the display screen 194, and the display function provided by the application processor, including images, controls, and the like displayed in the interfaces.

The electronic device 100 may implement the shooting function by using the ISP, the camera 193, the video codec, the GPU, the display screen 194, the application processor, and the like.

The ISP is configured to process data fed back by camera 193. For example, during shooting, a shutter is enabled, light is transmitted to a photosensitive element of the camera through a lens, an optical signal is converted into an electrical signal, and the photosensitive element of the camera transmits the electrical signal to the ISP for processing and converted into an image visible to a naked eye. The ISP may further perform algorithm optimization on noise and illuminance of an image. The ISP may further optimize parameters such as exposure and color temperature of a shooting scene. In some embodiments, the ISP may be disposed in the camera 193.

The camera 193 is configured to capture a still image or video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard RGB or YUV format. In some embodiments, the electronic device 100 may include one or N cameras 193, where N is a positive integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy. The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

In this embodiment of this application, the electronic device 100 may record videos and/or shooting photos through the shooting function provided by the ISP, the camera 193, the video codec, the GPU, the display screen 194, and the application processor shown in FIG. 1A to FIG. 1H, FIG. 2A to FIG. 2H, and FIG. 3A to FIG. 3G.

The internal memory 190 may include one or more random access memories (random access memories, RAMs) and one or more non-volatile memories (non-volatile memories, NVMs). The random access memory may be directly read and written by the processor 110, may be configured to store executable programs (for example, machine instructions) of an operating system or other running programs, or may be configured to store data of users and application programs. The non-volatile memory may also store executable programs, data of users and application programs, and the like, and may be loaded into the random access memory in advance for the processor 110 to perform direct reading and writing.

Program code corresponding to the shooting mode recommendation method provided in embodiments of this application may be stored in the non-volatile memory. In a scene in which a camera application is run, the electronic device 100 may load the program code stored in the non-volatile memory into the random access memory, and then send the program code to the processor 110 for execution, thereby implementing a function of automatically recognizing a shooting scene and recommending a shooting mode matching a current shooting scene to the user.

The external memory interface 130 may be configured to connect to an external non-volatile memory, to expand a storage capability of the electronic device 100. The external non-volatile memory communicates with the processor 110 by using the external memory interface 130, to implement a data storage function, for example, storing a file such as a video obtained by shooting in the external non-volatile memory.

The electronic device 100 may implement an audio function through the audio module 170, the application processor, and the like.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some function modules of the audio module 170 are disposed in the processor 110.

Specifically, the audio module 170 may include the speaker 170A, the telephone receiver 170B, the microphone 170C, and the headset jack 170D. The speaker 170A, also referred to as a "loudspeaker", is configured to convert an electrical audio signal into a sound signal. The telephone receiver 170B, also referred to as a "receiver", is configured to convert an electrical audio signal into a sound signal. In this embodiment of this application, after video recording starts, the electronic device 100 may encode an audio electrical signal of the microphone 170C, and then obtain a video audio track. The microphone 170C, also referred to as a "MIC" or "mike", is configured to convert a sound signal into an electrical signal. The headset jack 170D is configured to be connected to a wired headset.

The pressure sensor 180A is configured to sense a pressure signal, and can convert the pressure signal into an electrical signal. In some embodiments, the pressure sensor 180A may be disposed on the display screen 194. When a touch operation is performed on the display screen 194, the electronic device 100 detects intensity of the touch operation through the pressure sensor 180A. The electronic device 100 may also calculate a touch position based on a detection signal of the pressure sensor 180A.

The distance sensor 180F is configured to measure a distance. The electronic device 100 may measure a distance by infrared light or laser. In some embodiments, in a shooting scene, the electronic device 100 may measure a distance by using the distance sensor 180F, to implement quick focusing. In this embodiment of this application, the electronic device 100 may determine an object distance of an image by using the distance sensor 180F.

The ambient light sensor 180L is configured to sense illuminance of ambient light. In this embodiment of this application, the electronic device 100 may determine illuminance of an image by using the ambient light sensor 180L.

The touch sensor 180K is also referred to as a "touch device". The touch sensor 180K may be disposed on the display screen 194. The touch sensor 180K and the display screen 194 form a touchscreen, which is also referred to as a "touch screen". The touch sensor 180K is configured to detect a touch operation on or near the touch sensor 180K. The touch sensor may transfer a detected touch operation to the application processor to determine a type of a touch event. The touch sensor 180K may provide a visual output related to the touch operation by using the display screen 194. In some other embodiments, the touch sensor 180K may alternatively be disposed on a surface of the electronic device 100, and is located at a position different from a position of the display screen 194.

In this embodiment of this application, the electronic device 100 may detect, through a touch detection capability provided by the touch sensor 180K, a user operation such as a tap or slide by the user on a screen, to control enabling and disabling of an application program and a component, to implement jump and switch between the user interfaces shown in FIG. 1A to FIG. 1H, FIG. 2A to FIG. 2H, and FIG. 3A to FIG. 3G.

The term "user interface (user interface, UI)" in the specification and claims of this application and the accompanying drawings is a medium interface for interaction and information exchange between an application program or operating system and a user, and implements conversion between an internal form of information and a form of the information acceptable to the user. The user interface of the application program is source code written in a specific computer language such as java and the extensible markup language (extensible markup language, XML). The interface source code is parsed and rendered on a terminal device, and is finally presented as content that can be recognized by the user, such as a picture, a text, a button and other controls. A control (control), also referred to as a widget (widget), is a basic element of the user interface. Typical controls include a toolbar (toolbar), a menu bar (menu bar), a text box (text box), a button (button), a scrollbar (scrollbar), a picture, and a text. The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many application programs, such as hybrid applications (hybrid application), usually further include web pages. A web page, also referred to as a page, may be understood as a special control embedded in an application program interface. The web page is source code written in a specific computer language, such as the HyperText Markup Language (hyper text markup language, HTML), cascading style sheets (cascading style sheets, CSS), and java scripts (JavaScript, JS). The source code of the web page may be loaded and displayed by a browser or a web page display component with similar functions to the browser as content that can be recognized by the user. The specific content included in the web page is also defined by tags or nodes in the source code of the web page. For example, HTML defines elements and attributes of the web page through <p>, <img>, <video>, and <canvas>.

A commonly used expression form of the user interface is a graphical user interface (graphic user interface, GUI), which refers to a user interface related to a computer operation that is displayed in a graphical manner. The graphic user interface may be an interface element such as an icon, a window, or a control displayed in the display screen of the electronic device, the control may include an icon, a button, a menu, a tab, a text box, a dialog box, a status bar, a navigation bar, a Widget, and other visual interface elements.

As used in this specification and the claims of this application, a singular expression form, “one”, “a”, “said”, “foregoing”, “the”, or “this”, is intended to also include a plural expression form, unless clearly indicated to the contrary in the context. It should be further understood that the term “and/or” used in this application indicates and includes any or all possible combinations of one or more listed items. As used in the foregoing embodiments, based on the context, the term “when” may be interpreted as a meaning of “if”, “after”, “in response to determining . . . ”, or “in response to detecting . . . ”. Similarly, based on the context, the phrase “if determining” or “if detecting (a stated condition or event)” may be interpreted as a meaning of “when determining . . . ”, “in response to determining . . . ”, “when detecting (a stated condition or event)”, or “in response to detecting (a stated condition or event)”.

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The storage medium includes: any medium that can store program code, such as a ROM, a RAM, a magnetic disk, or an optical disc.

The invention claimed is:

1. A shooting mode recommendation method, applied to an electronic device comprising a camera, wherein the method comprises:

displaying a first preview interface, wherein the first preview interface comprises a first preview window, and the first preview window is configured to display an image captured by the camera in real time;

capturing one or more images through the camera in a first time period;

determining a first shooting mode based on the one or more images captured in the first time period;

displaying a first control in the first preview interface, wherein the first control is configured to trigger the electronic device to perform video recording in the first shooting mode; and if a first operation for the first control is not detected within a first preset time, displaying the first preview window, and skipping displaying the first control; or if a first operation for the first control is detected within first preset time, displaying a second preview interface in response to the first operation, wherein the second preview interface comprises a second preview window, the second preview window is configured to display a first image, and the first image is an image obtained by processing an image captured by the camera in real time in the first shooting mode, wherein after displaying the first preview window, and skipping displaying the first control, the method further comprises:

capturing one or more images through the camera in a second time period, wherein the second time period is different from the first time period;

determining a second shooting mode based on the one or more images captured in the second time period;

displaying a second control in the first preview interface, wherein the second control is configured to trigger the electronic device to perform video recording in the second shooting mode, and the second shooting mode is different from the first shooting mode; and if a second operation for the second control is not detected within a second preset time, displaying the first preview window, and skipping displaying the second control; or if a second operation for the second control is detected within second preset time, displaying a third preview interface in response to the second operation, wherein the third preview interface comprises a third preview window, the third preview window is configured to display a second image, and the second image is an image obtained by processing an image captured by the camera in real time in the second shooting mode.

2. The method according to claim 1, wherein after the displaying a first control in the first preview interface, the method further comprises:

determining, based on one or more images captured in a third time period, that a matching condition of the first shooting mode is not satisfied; and no longer displaying the first control, wherein the third time period is after the first time period, and the third time period is within the first preset time.

3. The method according to claim 2, wherein before the no longer displaying the first control, the method further comprises: determining that the one or more images captured in the third time period satisfy an exit condition of the first shooting mode, wherein the exit condition is mutually exclusive but not opposite to the matching condition.

4. The method according to claim 2, wherein the second time period is before the third time period, and the displaying a second control in the first preview interface specifically comprises:

displaying the second control and the first control in the first preview interface.

5. The method according to claim 4, wherein the method further comprises:

detecting a third operation for the first control and the second control; and displaying a fourth preview interface in response to the third operation, wherein the fourth preview interface comprises a fourth preview window and a fifth preview window, the fourth preview window is configured to display the first image, and the fifth preview window is configured to display the second image.

6. The method according to claim 1, wherein the determining a first shooting mode based on the one or more images captured in the first time period specifically comprises:

determining the first shooting mode when the one or more images captured in the first time period satisfy both the matching condition of the first shooting mode and a matching condition of a third shooting mode, and a priority of the first shooting mode is higher than a priority of the third shooting mode.

7. The method according to claim 1, wherein the first preview interface is a photograph preview interface or a recorded video preview interface.

8. The method according to claim 1, wherein the first shooting mode is any one of the following plurality of shooting modes: a macro mode, a night scene mode, a portrait mode, a high dynamic range mode, a protagonist mode, or a multi-lens mode; and the second shooting mode is any one of the following plurality of shooting modes: the macro mode, the night scene mode, the portrait mode, the high dynamic range mode, the protagonist mode, or the multi-lens mode.

9. The method according to claim 8, wherein when the first shooting mode is the macro mode, the determining a first shooting mode based on the one or more images captured in the first time period is specifically:

determining object distances of the one or more images captured in the first time period; and determining, based on that each of the object distances is less than a preset value, that the first shooting mode is the macro mode.

10. The method according to claim 8, wherein when the first shooting mode is the night scene mode, the determining a first shooting mode based on the one or more images captured in the first time period is specifically:

determining illuminance of the one or more images captured in the first time period; and determining, based on that the illuminance is less than a preset value, that the first shooting mode is the night scene mode.

11. The method according to claim 8, wherein when the first shooting mode is the portrait mode, the determining a first shooting mode based on the one or more images captured in the first time period is specifically:

determining object information of each image of the one or more images captured in the first time period; and determining that the first shooting mode is the portrait mode when the object information of each image indicates that each image comprises a portrait, and a portrait area is greater than a preset value.

12. The method according to claim 8, wherein when the first shooting mode is the high dynamic range mode, the determining a first shooting mode based on the one or more images captured in the first time period is specifically:

determining exposure proportions of the one or more images captured in the first time period; and determining that the first shooting mode is the high dynamic range mode when each of the exposure proportions is greater than a preset value.

13. An electronic device, comprising one or more processors and one or more memories, wherein the one or more memories are coupled to the one or more processors, the one or more memories are configured to store computer program code, the computer program code comprises computer instructions, and when the one or more processors execute the computer instructions, the method according to claim 1 is performed.

14. A shooting mode recommendation method, applied to an electronic device comprising a camera, wherein the method comprises:

displaying a first preview interface, wherein the first preview interface comprises a first preview window, and the first preview window is configured to display an image captured by the camera in real time;

capturing one or more images through the camera in a first time period;

determining a first shooting mode based on the one or more images captured in the first time period;

displaying a first control in the first preview interface, wherein the first control is configured to trigger the electronic device to perform video recording in the first shooting mode;

capturing one or more images through the camera in a second time period;

determining a second shooting mode based on the one or more images captured in the second time period;

displaying a second control in the first preview interface, wherein the second control is configured to trigger the electronic device to perform video recording in the second shooting mode, and the second shooting mode is different from the first shooting mode;

determining another shooting mode based on one or more images captured by the camera in another time period;

displaying another control in the first preview interface, wherein the another control is configured to trigger the electronic device to perform video recording in the another shooting mode, and the another shooting mode is different from the first shooting mode, and is also different from the second shooting mode;

detecting a third operation for the first control, the second control, or the another control;

displaying a fourth preview interface in response to the third operation, wherein the fourth preview interface comprises a fourth preview window and a fifth preview window, the fourth preview window and the fifth preview window are displayed in a tiled manner, and a sum of display areas of the fourth preview window and the fifth preview window is equal to a display area of the first preview window;

the fourth preview window is configured to display a first image, and the first image is an image obtained by processing an image captured by the camera in real time in the first shooting mode; and the fifth preview window is configured to display a second image, and the second image is an image obtained by processing an image captured by the camera in real time in the second shooting mode;

detecting an operation for the fourth preview window, and displaying a second preview interface in response to the operation, wherein the second preview interface comprises a second preview window, a display area of the second preview window is equal to the display area of the first preview window, and the second preview window is configured to display the first image; and detecting an operation for a shooting control in the second preview interface, and starting video recording in response to the operation.

15. The method according to claim 14, wherein the method further comprises:

if a first operation for the first control is not detected within a first preset time, no longer displaying the first control; and if a second operation for the second control is not detected within a second preset time, no longer displaying the second control.

16. The method according to claim 15, wherein after the displaying a first control in the first preview interface, the method further comprises:

determining, based on one or more images captured in a third time period, that a matching condition of the first shooting mode is not satisfied; and no longer displaying the first control, wherein the third time period is after the first time period, and the third time period is within the first preset time.

17. The method according to claim 16, wherein before the no longer displaying the first control, the method further comprises: determining that the one or more images captured in the third time period satisfy an exit condition of the first shooting mode, wherein the exit condition is mutually exclusive but not opposite to the matching condition.

18. The method according to claim 14, wherein the first preview interface is a recorded video preview interface.

19. The method according to claim 14, wherein the first shooting mode is any one of the following plurality of shooting modes: a macro mode, a night scene mode, a portrait mode, a high dynamic range mode, a protagonist mode, or a multi-lens mode; and the second shooting mode is any one of the following plurality of shooting modes: the macro mode, the night scene mode, the portrait mode, the high dynamic range mode, the protagonist mode, or the multi-lens mode.

* * * * *